US009236029B2

(12) United States Patent
Barnhoefer et al.

(10) Patent No.: US 9,236,029 B2
(45) Date of Patent: Jan. 12, 2016

(54) HISTOGRAM GENERATION AND EVALUATION FOR DYNAMIC PIXEL AND BACKLIGHT CONTROL

(71) Applicant: APPLE INC., Cupertino, CA (US)

(72) Inventors: Ulrich T. Barnhoefer, Cupertino, CA (US); Robert E. Jeter, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 157 days.

(21) Appl. No.: 14/023,412

(22) Filed: Sep. 10, 2013

(65) Prior Publication Data

US 2014/0078166 A1 Mar. 20, 2014

Related U.S. Application Data

(60) Provisional application No. 61/699,768, filed on Sep. 11, 2012.

(51) Int. Cl.

| | |
|---|---|
| ***G09G 5/10*** | (2006.01) |
| ***G09G 3/34*** | (2006.01) |
| ***G09G 3/36*** | (2006.01) |
| ***G06T 5/40*** | (2006.01) |
| ***H04N 1/60*** | (2006.01) |
| ***H04N 5/57*** | (2006.01) |
| ***H04N 1/40*** | (2006.01) |

(52) U.S. Cl.

CPC ................ *G09G 5/10* (2013.01); *G09G 3/3406* (2013.01); *G09G 3/3607* (2013.01); *G09G 2320/0271* (2013.01); *G09G 2320/0626* (2013.01); *G09G 2320/0646* (2013.01); *G09G 2360/16* (2013.01)

(58) Field of Classification Search

CPC combination set(s) only.
See application file for complete search history.

(56) References Cited

U.S. PATENT DOCUMENTS

| | | | | |
|---|---|---|---|---|
| 7,821,490 | B2 | 10/2010 | Fletcher et al. | |
| 7,973,758 | B2 | 7/2011 | Lo | |
| 8,194,028 | B2 | 6/2012 | Fletcher et al. | |
| 2003/0231194 | A1* | 12/2003 | Morgan et al. | 345/691 |

(Continued)

FOREIGN PATENT DOCUMENTS

| | | | |
|---|---|---|---|
| EP | 2124218 | A2 | 11/2009 |
| EP | 2221801 | A1 | 8/2010 |

OTHER PUBLICATIONS

International Search Report and Written Opinion for PCT Application No. PCT/US2013/059245 dated Dec. 4, 2013; 14 pgs.

(Continued)

*Primary Examiner* — Wesner Sajous
(74) *Attorney, Agent, or Firm* — Fletcher Yoder PC

(57) ABSTRACT

Systems, methods, and devices are provided for histogram generation and evaluation used in adjusting the power consumed by a backlight of an electronic display. One such method involves generating a pixel brightness histogram of an image frame passing through a pixel pipeline in a nonlinear space. One or more pixel brightness values from the histogram may be selected before being converted from the nonlinear space into a linear space. A tone mapping function and backlight intensity are determined based at least in part on the one or more pixel brightness values in the linear space. The resulting tone mapping function is converted to the nonlinear space and applied to the image frame or a subsequent image frame in the pixel pipeline. The pixels of the image frame to which the nondistorting portion of the tone mapping function is applied may appear substantially undistorted despite a reduction in backlight intensity.

28 Claims, 11 Drawing Sheets

(56) References Cited

U.S. PATENT DOCUMENTS

| | | | | |
|---|---|---|---|---|
| 2004/0113906 | A1 | 6/2004 | Lew et al. | |
| 2004/0218830 | A1* | 11/2004 | Kang et al. | 382/274 |
| 2008/0068472 | A1* | 3/2008 | Zhou | 348/236 |
| 2009/0109232 | A1 | 4/2009 | Kerofsky | |
| 2010/0128332 | A1* | 5/2010 | Wakazono et al. | 358/521 |
| 2010/0157038 | A1* | 6/2010 | Hitokata | 348/68 |
| 2012/0075353 | A1 | 3/2012 | Dong et al. | |
| 2012/0218313 | A1 | 8/2012 | Chiou et al. | |
| 2012/0288197 | A1* | 11/2012 | Adachi | 382/167 |
| 2013/0076763 | A1* | 3/2013 | Messmer | 345/506 |

OTHER PUBLICATIONS

N. Raman et al.; "Dynamic contrast enhancement of liquid crystal displays with backlight modulation," 1005 Digest of Technical Papers, International Conference on Consumer Electronics (IEEE Cat. No. 05CH37619), Jan. 8, 2005; XP010796599, pp. 197-198.

* cited by examiner

HISTOGRAM GENERATION AND EVALUATION FOR DYNAMIC PIXEL AND BACKLIGHT CONTROL

CROSS REFERENCE TO RELATED APPLICATIONS

This application is a nonprovisional patent application of U.S. Provisional Patent Application No. 61/699,768, filed Sep. 11, 2012, titled "DYNAMIC PIXEL AND BACKLIGHT CONTROL", which is incorporated by reference herein in its entirety for all purposes.

BACKGROUND

This disclosure relates to increasing image pixel brightness values while lowering backlight intensity, thereby saving power while distorting the appearance of only a fraction of the pixels.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Liquid crystal displays (LCDs) are commonly used as screens or displays for a wide variety of electronic devices, including such consumer electronics as televisions, computers, and handheld devices (e.g., cellular telephones, audio and video players, gaming systems, and so forth). Such LCD devices typically provide a flat display in a relatively thin package that is suitable for use in a variety of electronic goods. In addition, such LCD devices typically use less power than comparable display technologies, making them suitable for use in battery-powered devices or in other contexts where it is desirable to minimize power usage.

Often, the LCD device is a portable device. Accordingly, power consumption may become an issue, since a user may not always have external power sources readily available. One major component of the portable device that consumes power is the backlight of the LCD. Accordingly, it may be advantageous to devise power saving techniques and hardware that may reduce the energy consumption of the backlight unit of the device, while still providing a user experience similar to that provided when the device is attached to an external power source.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

This disclosure relates to systems and methods for reducing the power consumption of an electronic display based on a desired degree of pixel distortion. For example, a tone mapping function may be determined on a frame-by-frame basis. The tone mapping function may have two or more slopes when considered in linear space: a nondistorting slope and a distorting slope. The nondistorting slope may be used to lower the initially called-for intensity of the backlight while increasing the brightness values of most pixels without distortion—that is, the pixels modified by the nondistorting slope would look substantially as if they had not been modified and as if the backlight intensity had not been changed. The distorting slope may modify a certain desired percentage of the pixels of the image frame in a way that reduces their contrast when the backlight intensity is modified. The percentage of pixels distorted by the distorting slope may be so small as to be undetectable to most users. Even so, using a tone mapping function that has the distorting slope may allow the nondistorting slope to be a higher value than otherwise—thereby offering more aggressive pixel brightness increases and more aggressive backlight intensity reductions, saving even more power.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
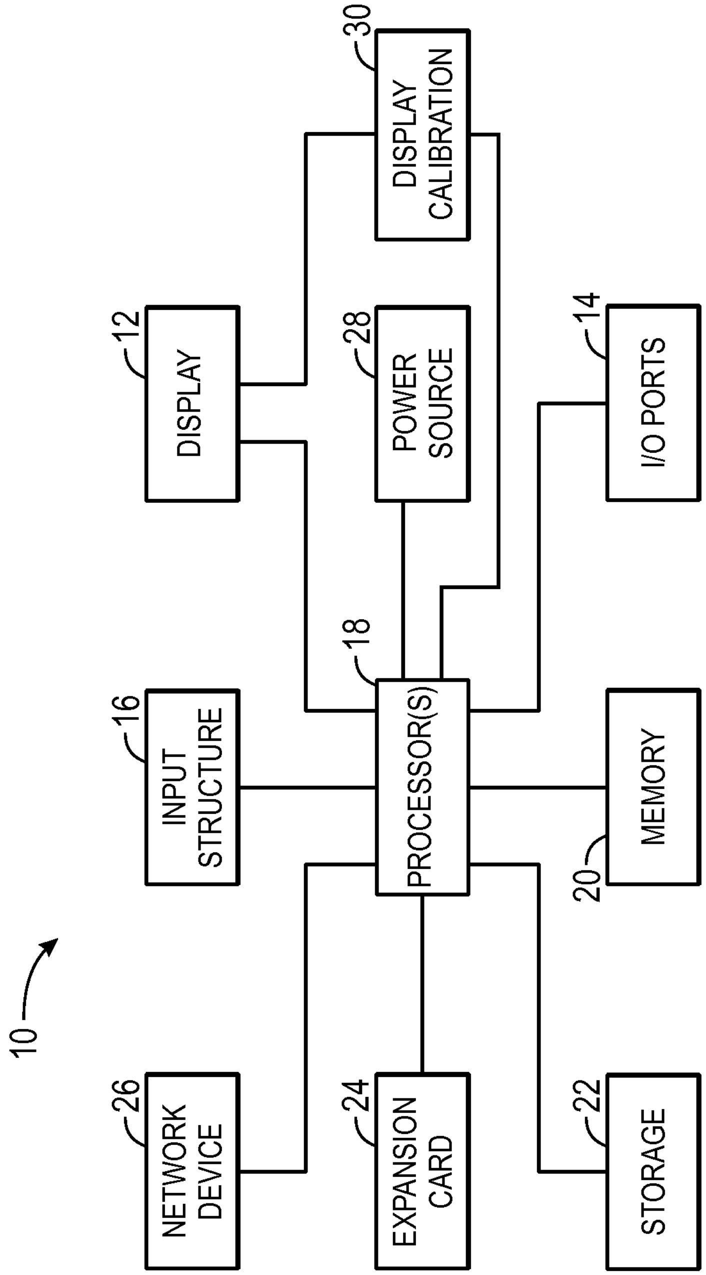
FIG. 1 is a block diagram of an electronic device in accordance with aspects of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Substantial power savings may be gained by increasing pixel brightness values while simultaneously reducing the initially called-for intensity of a backlight unit in a display. The initially called-for intensity of the backlight is used herein to refer to the intensity of the backlight that the system would apply if the dynamic pixel and backlight system of this disclosure did not modify the backlight intensity. The initially called-for intensity may be reduced substantially, however, by adjusting the brightness values of the pixel data being sent to the display. Thus, red, green, and blue pixel values (for the case of an RGB display) in an image frame may be changed from their original values to new, brighter (i.e., more light-transmissive), values. At the same time, the initially called-for intensity of the backlight unit may be reduced accordingly. The resultant picture seen by the user may be nearly identical to the situation in which the backlight is driven at the original level with the original pixel data values. At the same time, however, the amount of power consumed by the backlight unit may be reduced substantially.

In this disclosure, the pixels may be adjusted using tone mapping functions that include a nondistorting slope and a distorting slope applied to different levels of brightnesses of pixels of the image frame. For example, the nondistorting slope may be applied to all pixels from the darkest brightness value up to a kneepoint brightness value and may not distort the appearance of the pixels when the backlight intensity is reduced accordingly and the pixels are displayed on the display. By contrast, the distorting slope may be applied to pixels from the kneepoint brightness value up to a maximum desired brightness value and the distorting slope may distort the appearance of these pixels to some degree. Even so, the backlight intensity may be more sharply reduced as the nondistorting slope gets higher, and the presence of the distorting slope allows the nondistorting slope to become higher than otherwise. Accordingly, generating and applying a tone mapping function that includes a distorting slope and a nondistorting slope, as described below, may allow for substantial power savings over many other tone mapping functions. The number of distorted pixels may be selected to be small enough so as not to affect perception of the image by the user.

The tone mapping function, in some embodiments, may be generated such that the distorted pixels to which the distorting slope is applied are selected as a percentage of pixel values over a threshold. Dark pixels beneath the threshold may not actually represent an image, and so only those pixels above the threshold may be used to determine how many pixels to purposely distort. In this way, the tone mapping function, as applied to a frame of a movie or image surrounded by a black matte bars, for instance, may avoid unduly distorting the part of the display that shows the actual image.

Furthermore, the generation of the tone mapping function and the modification of the backlight unit may be accomplished outside of the pixel pipeline. This structure allows for reductions in overall computations by the system. Additionally, as incoming frames each call for the backlight unit to perform in a different manner (e.g., transmit more or less luminance), the system may take into account these frames and allow for specific transitions from, for example, dark images to light images to be completed without interruption by further calculations of the system.

This technique of altering the backlight luminance and adjusting unit pixel transmittance in tandem may also be selectively turned "off" by causing the tone mapping function to gradually transition, via a temporal filter, to a unity slope (1:1) applied to all pixels of the image frame. Since a unity slope will make no change to the pixels, the backlight intensity will not change and neither will the pixels, thereby providing an elegant way to appear to turn "off" the power-saving measures of this disclosure. In one example, the unity slope may be gradually applied to turn the system "off" when a user interface screen is the image on the display. The process may be turned back "on" when, for example, a movie is being viewed and a target tone mapping function reapplied. Additionally, as noted above, the technique of altering the backlight luminance and adjusting unit pixel transmittance in tandem may allow for power savings of the entire device, since the backlight is being driven at a lower current (i.e., less power is consumed) while still providing an acceptable user experience (e.g., a user may be unable to detect the reduction in the intensity of the backlight because the brightness of the device and overall image displayed may appear substantially unchanged from the perspective of the user.) In fact, a lower backlight intensity may also reduce light leakage around dark pixels.

Example Electronic Devices

As may be appreciated, electronic devices may include various internal and/or external components that contribute to the function of the device. For instance, FIG. 1 is a block diagram illustrating components that may be present in one such electronic device 10. Those of ordinary skill in the art will appreciate that the various functional blocks shown in FIG. 1 may include hardware elements (including circuitry), software elements (including computer code stored on a computer-readable medium, such as a hard drive or system memory), or a combination of both hardware and software elements. FIG. 1 is only one example of a particular implementation and is merely intended to illustrate the types of components that may be present in the electronic device 10. For example, in the presently illustrated embodiment, these components may include a display 12, input/output (I/O) ports 14, input structures 16, one or more processors 18, one or more memory devices 20, nonvolatile storage 22, expansion card(s) 24, networking device 26, power source 28, and a display and backlight control component 30.

The display 12 may be used to display various images generated by the electronic device 10. The display 12 may be any suitable display using a backlight and light-modulating pixels, such as a liquid crystal display (LCD). Additionally, in certain embodiments of the electronic device 10, the display 12 may be provided in conjunction with a touch-sensitive element, such as a touchscreen, that may be used as part of the control interface for the device 10.

The I/O ports 14 may include ports configured to connect to a variety of external devices, such as a power source, headset or headphones, or other electronic devices (such as handheld devices and/or computers, printers, projectors, external displays, modems, docking stations, and so forth). The I/O ports 14 may support any interface type, such as a universal serial bus (USB) port, a video port, a serial connection port, an IEEE-1394 port, a speaker, an Ethernet or modem port, and/or an AC/DC power connection port.

The input structures 16 may include the various devices, circuitry, and pathways by which user input or feedback is provided to processor(s) 18. Such input structures 16 may be configured to control a function of an electronic device 10, applications running on the device 10, and/or any interfaces or devices connected to or used by device 10. For example, input structures 16 may allow a user to navigate a displayed user interface or application interface. Non-limiting examples of input structures 16 include buttons, sliders, switches, control pads, keys, knobs, scroll wheels, keyboards, mice, touchpads, microphones, and so forth. Additionally, in certain embodiments, one or more input structures 16 may be provided together with display 12, such an in the case of a touchscreen, in which a touch sensitive mechanism is provided in conjunction with display 12.

Processors 18 may provide the processing capability to execute the operating system, programs, user and application interfaces, and any other functions of the electronic device 10. The processors 18 may include one or more microprocessors, such as one or more "general-purpose" microprocessors, one or more special-purpose microprocessors or ASICS, or some combination of such processing components. For example, the processors 18 may include one or more reduced instruction set (RISC) processors, as well as graphics processors, video processors, audio processors, and the like. As will be appreciated, the processors 18 may be communicatively coupled to one or more data buses or chipsets for transferring data and instructions between various components of the electronic device 10.

Programs or instructions executed by processor(s) 18 may be stored in any suitable manufacture that includes one or more tangible, computer-readable media at least collectively storing the executed instructions or routines, such as, but not limited to, the memory devices and storage devices described below. Also, these programs (e.g., an operating system) encoded on such a computer program product may also include instructions that may be executed by the processors 18 to enable device 10 to provide various functionalities, including those described herein.

The instructions or data to be processed by the one or more processors 18 may be stored in a computer-readable medium, such as a memory 20. The memory 20 may include a volatile memory, such as random access memory (RAM), and/or a non-volatile memory, such as read-only memory (ROM). The memory 20 may store a variety of information and may be used for various purposes. For example, the memory 20 may store firmware for electronic device 10 (such as basic input/output system (BIOS), an operating system, and various other programs, applications, or routines that may be executed on electronic device 10. In addition, the memory 20 may be used for buffering or caching during operation of the electronic device 10.

The components of the device 10 may further include other forms of computer-readable media, such as non-volatile storage 22 for persistent storage of data and/or instructions. Non-volatile storage 22 may include, for example, flash memory, a hard drive, or any other optical, magnetic, and/or solid-state storage media. Non-volatile storage 22 may be used to store firmware, data files, software programs, wireless connection information, and any other suitable data.

The embodiment illustrated in FIG. 1 may also include one or more card or expansion slots. The card slots may be configured to receive one or more expansion cards 24 that may be used to add functionality, such as additional memory, I/O functionality, or networking capability, to electronic device 10. Such expansion cards 24 may connect to device 10 through any type of suitable connector, and may be accessed internally or external to the housing of electronic device 10. For example, in one embodiment, expansion cards 24 may include a flash memory card, such as a SecureDigital (SD) card, mini- or microSD, CompactFlash card, Multimedia card (MMC), or the like. Additionally, expansion cards 24 may include one or more processor(s) 18 of the device 10, such as a video graphics card having a GPU for facilitating graphical rendering by device 10.

The components depicted in FIG. 1 also include a network device 26, such as a network controller or a network interface card (NIC). In one embodiment, the network device 26 may be a wireless NIC providing wireless connectivity over any 802.11 standard or any other suitable wireless networking standard. The device 10 may also include a power source 28. In one embodiment, the power source 28 may include one or more batteries, such as a lithium-ion polymer battery or other type of suitable battery. Additionally, the power source 28 may include AC power, such as provided by an electrical outlet, and electronic device 10 may be connected to the power source 28 via a power adapter. This power adapter may also be used to recharge one or more batteries of device 10.

The electronic device 10 may also include a display and backlight control component 30. In one embodiment, the display and backlight control component 30 may be used to dynamically alter the amount of luminance emanating from a backlight unit of the display, as well as alter pixel values transmitted to the display. Through this combined modification, an image may be generated, for example, by using backlight and, thus, consuming less power. However, by modifying pixel values in conjunction with the brightness of the backlight unit, differences in quality and brightness of an image on the display maybe unperceivable or not noticeable, even though less power is being consumed by the device 10 to generate the image.

The electronic device 10 may take the form of a computer system or some other type of electronic device. Such computers may include computers that are generally portable (such as laptop, notebook, tablet, and handheld computers), as well as computers that are generally used in one place (such as conventional desktop computers, workstations and/or servers). In certain embodiments, electronic device 10 in the form of a computer may include a model of a MacBook®, MacBook® Pro, MacBook Air®, iMac®, Mac® mini, or Mac® Pro available from Apple Inc. of Cupertino, Calif.

Figure 2:
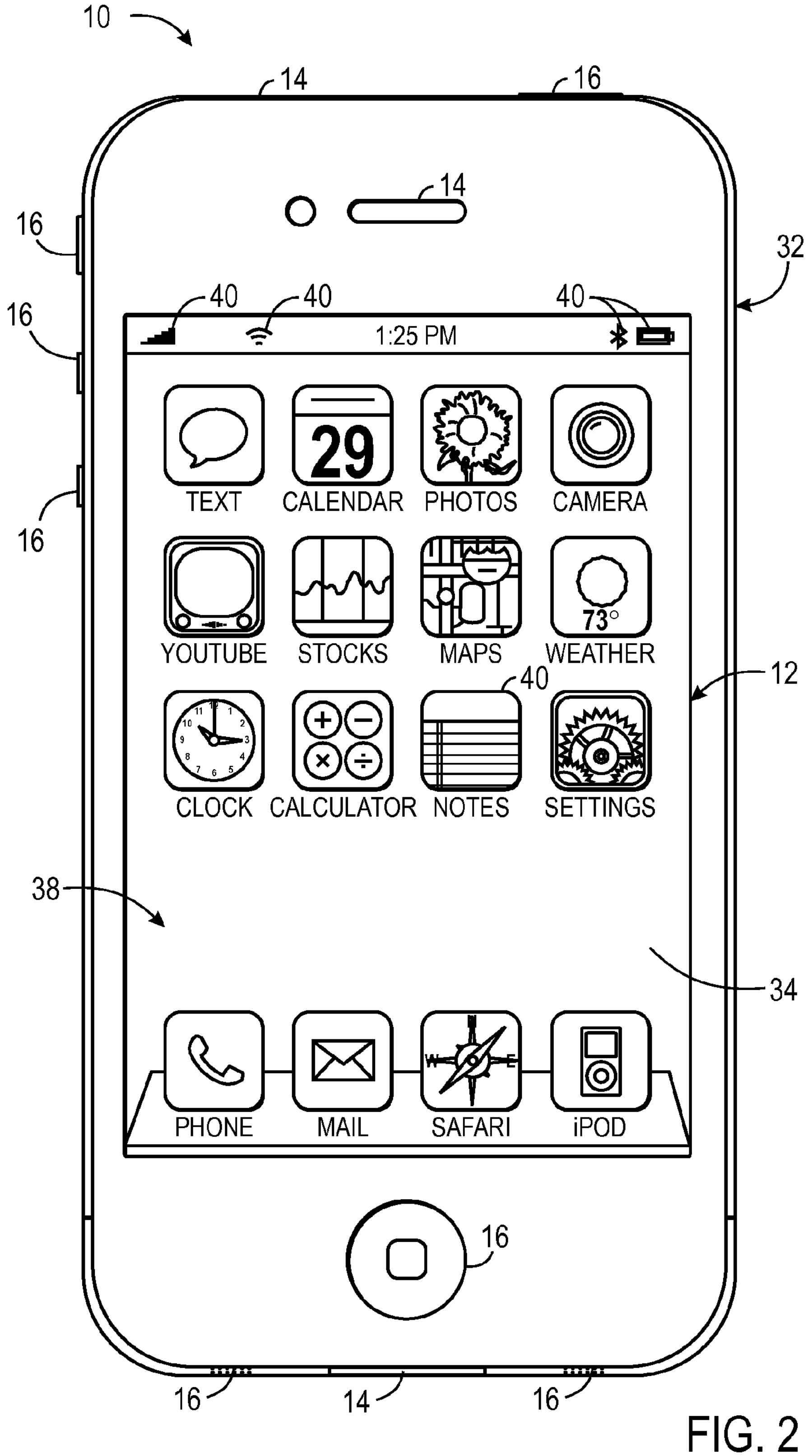
FIG. 2 is a perspective view of a cellular device in accordance with aspects of the present disclosure.
Figure 3:
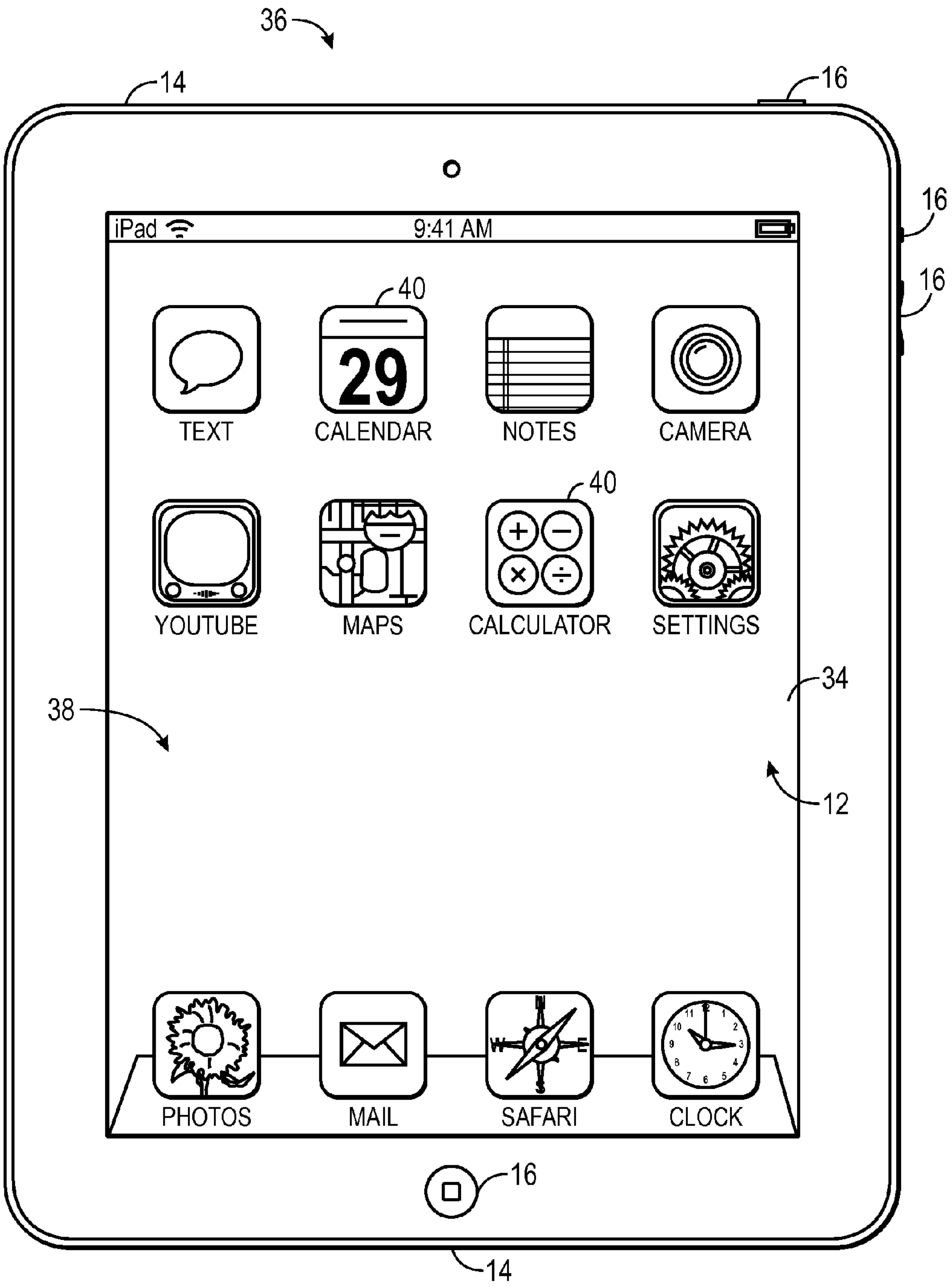
FIG. 3 is a perspective view of a handheld electronic device in accordance with aspects of the present disclosure.

The electronic device 10 may also take the form of other types of electronic devices. In some embodiments, various electronic devices 10 may include mobile telephones, media players, personal data organizers, handheld game platforms, cameras, and combinations of such devices. For instance, as generally depicted in FIG. 2, the device 10 may be provided in the form of a cellular device 32 (such as a model of an iPhone®), that includes various functionalities (such as the ability to take pictures, make telephone calls, access the Internet, communicate via email, record audio and video, listen to music, play games, and connect to wireless networks). Alternatively, as depicted in FIG. 3, the electronic device 10 may be provided in the form of a handheld electronic device 33. By way of further example, handheld device 33 may be a model of an iPod® or iPad® available from Apple Inc. of Cupertino, Calif.

Display Operation

Electronic device 10 of the presently illustrated embodiment includes a display 12, which may be in the form of an LCD 34. The LCD 34 may display various images generated by electronic device 10, such as a graphical user interface (GUI) 38 having one or more icons 40. The device 36 may also include various I/O ports 14 to facilitate interaction with other devices, and user input structures 16 to facilitate interaction with a user.

Figure 4:
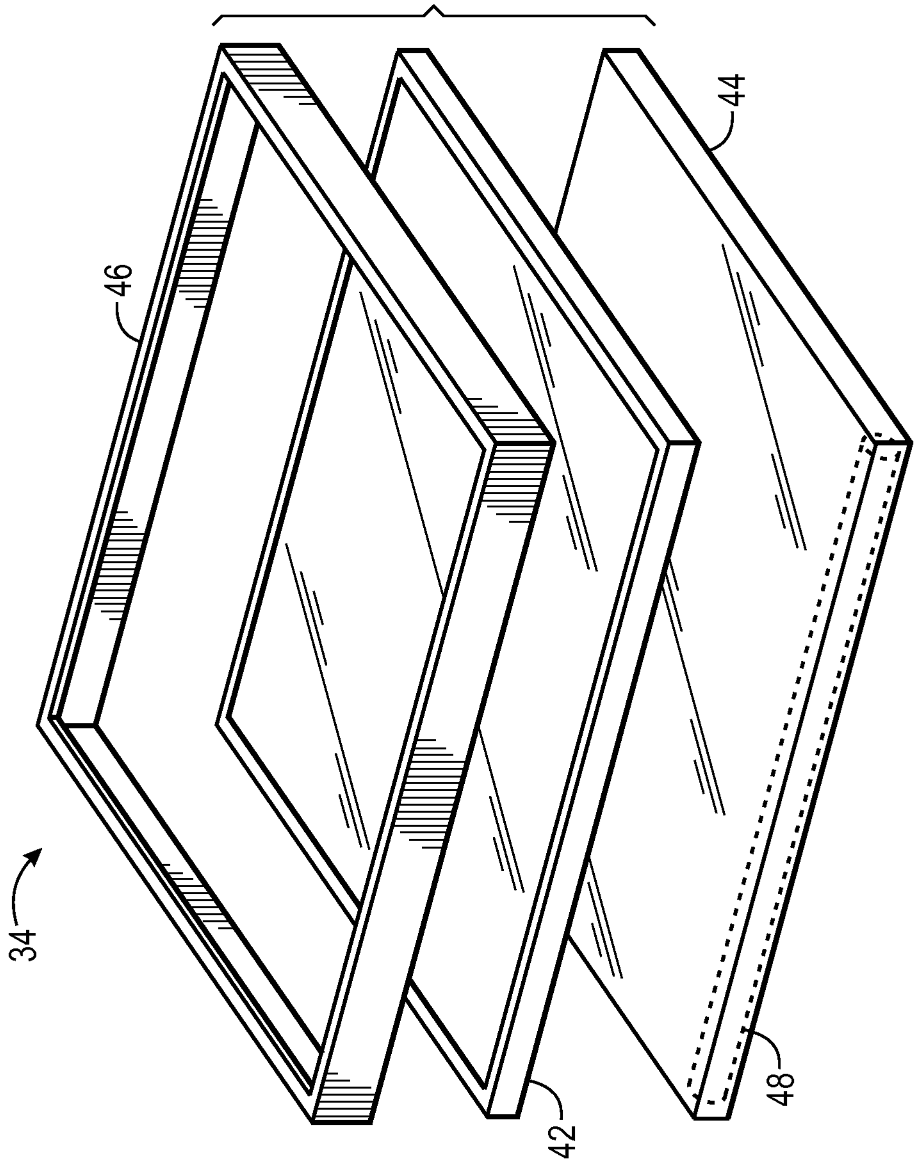
FIG. 4 is an exploded view of a liquid crystal display (LCD) in accordance with aspects of the present disclosure.

One example of an LCD display 34 of the electronic device 10 is depicted in FIG. 4 in accordance with one embodiment. The depicted LCD display 34 includes an LCD panel 42 and a backlight unit 44, which may be assembled within a frame 46. As may be appreciated, the LCD panel 42 may include an array of pixels configured to selectively modulate the amount and color of light passing from the backlight unit 44 through the LCD panel 42. For example, the LCD panel 42 may include a liquid crystal layer, one or more thin film transistor (TFT) layers configured to control orientation of liquid crystals of the liquid crystal layer via an electric field, and polarizing films, which cooperate to enable the LCD panel 42 to control the amount of light emitted by each pixel. Additionally, the LCD panel 42 may include color filters that allow specific colors of light to be emitted from the pixels (e.g., red, green, and blue).

The backlight unit 44 includes one or more light sources 48. Light from the light source 48 is routed through portions of the backlight unit 44 (e.g., a light guide and optical films) and generally emitted toward the LCD panel 42. In various embodiments, light source 48 may include a cold-cathode fluorescent lamp (CCFL), one or more light emitting diodes (LEDs), or any other suitable source(s) of light. Further, although the LCD 34 is generally depicted as having an edge-lit backlight unit 44, it is noted that other arrangements may be used (e.g., direct backlighting) in full accordance with the present technique.

Figure 5:
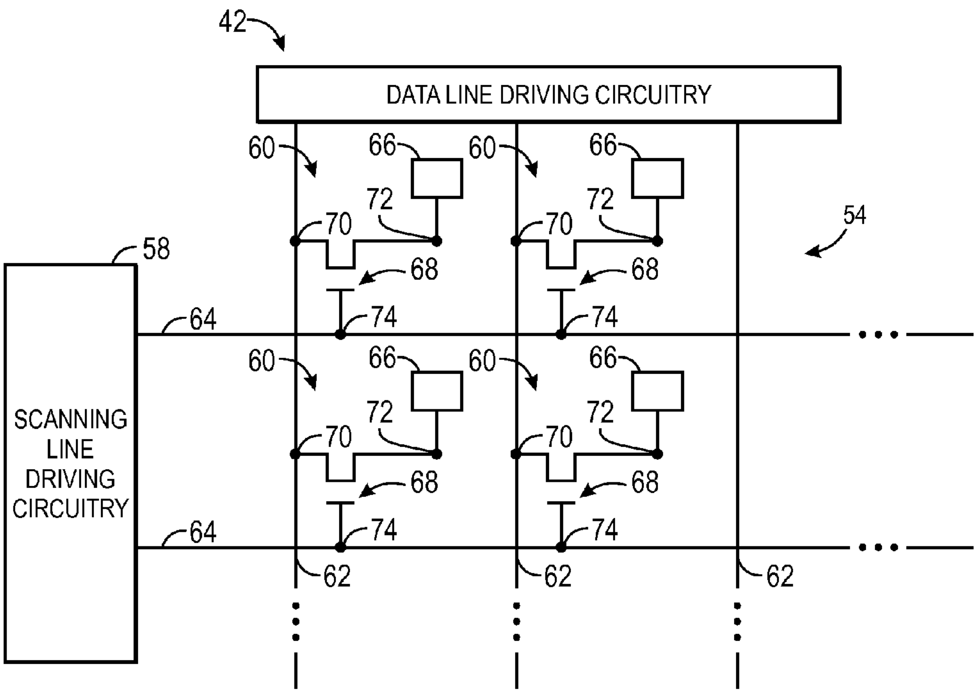
FIG. 5 graphically depicts circuitry that may be found in the LCD of FIG. 4 in accordance with aspects of the present disclosure.

Referring now to FIG. 5, an example of a circuit view of pixel-driving circuitry found in an LCD 34 is provided. For example, the circuitry depicted in FIG. 5 may be embodied on the LCD panel 42 described above with respect to FIG. 4. The pixel-driving circuitry includes an array or matrix 54 of unit pixels 60 that are driven by data (or source) line driving circuitry 56 and scanning (or gate) line driving circuitry 58. As depicted, the matrix 54 of unit pixels 60 forms an image display region of the LCD 34. In such a matrix, each unit pixel 60 may be defined by the intersection of data lines 62 and scanning lines 64, which may also be referred to as source lines 62 and gate (or video scan) lines 64. The data line driving circuitry 56 may include one or more driver integrated circuits (also referred to as column drivers) for driving the data lines 62. The scanning line driving circuitry 58 may also include one or more driver integrated circuits (also referred to as row drivers).

Each unit pixel 60 includes a pixel electrode 66 and thin film transistor (TFT) 68 for switching the pixel electrode 66. In the depicted embodiment, the source 70 of each TFT 68 is electrically connected to a data line 62 extending from respective data line driving circuitry 56, and the drain 72 is electrically connected to the pixel electrode 66. Similarly, in the depicted embodiment, the gate 74 of each TFT 68 is electrically connected to a scanning line 64 extending from respective scanning line driving circuitry 58.

In one embodiment, column drivers of the data line driving circuitry 56 send image signals to the pixels via the respective data lines 62. Such image signals may be applied by line-sequence, i.e., the data lines 62 may be sequentially activated during operation. The scanning lines 64 may apply scanning signals from the scanning line driving circuitry 58 to the gate 74 of each TFT 68. Such scanning signals may be applied by line-sequence with a predetermined timing or in a pulsed manner.

Each TFT 68 serves as a switching element which may be activated and deactivated (i.e., turned on and off) for a predetermined period based on the respective presence or absence of a scanning signal at its gate 74. When activated, a TFT 68 may store the image signals received via a respective data line 62 as a charge in the pixel electrode 66 with a predetermined timing.

The image signals stored at the pixel electrode 66 may be used to generate an electrical field between the respective pixel electrode 66 and a common electrode. Such an electrical field may align liquid crystals within a liquid crystal layer to modulate light transmission through the LCD panel 42. Unit pixels 60 may operate in conjunction with various color filters, such as red, green, and blue filters. In such embodiments, a "pixel" of the display may actually include multiple unit pixels, such as a red unit pixel, a green unit pixel, and a blue unit pixel, each of which may be modulated to increase or decrease the amount of light emitted to enable the display to render numerous colors via additive mixing of the colors.

In some embodiments, a storage capacitor may also be provided in parallel to the liquid crystal capacitor formed between the pixel electrode 66 and the common electrode to prevent leakage of the stored image signal at the pixel electrode 66. For example, such a storage capacitor may be provided between the drain 72 of the respective TFT 68 and a separate capacitor line.

Figure 6:
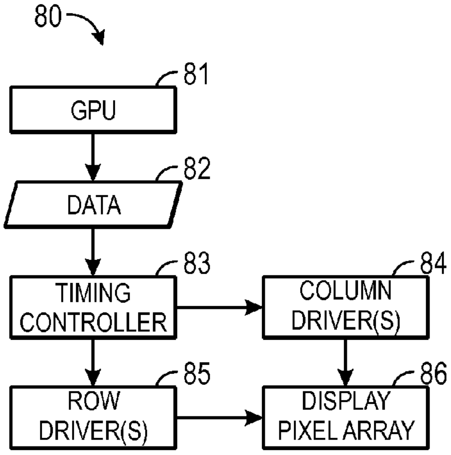
FIG. 6 is a block diagram representative of how the LCD of FIG. 4 receives image data and drives a pixel array of the LCD in accordance with aspects of the present disclosure.

Certain components for processing image data and rendering images on an LCD 34 based on such data are depicted in block diagram 80 of FIG. 6 in accordance with an embodiment. In the illustrated embodiment, a graphics processing unit (GPU) in block 81, or some other processor 18, transmits data in block 82 to a timing controller in block 83 of the LCD 34. The data generally includes image data that may be processed by circuitry of the LCD 34 to drive the unit pixels 60 of, and render an image on, the LCD 34. The timing controller, in block 83, may then send signals to, and control operation of, one or more column drivers (or other data line driving circuitry 56) in block 84 and one or more row drivers in block 85 (or other scanning line driving circuitry 58). These column drivers and row drivers may generate analog signals for driving the various unit pixels 60 of a pixel array of the LCD 34 in block 86 to generate images on the LCD 34.

Dynamic Pixel and Backlight Control Component (DPB)

Figure 7:
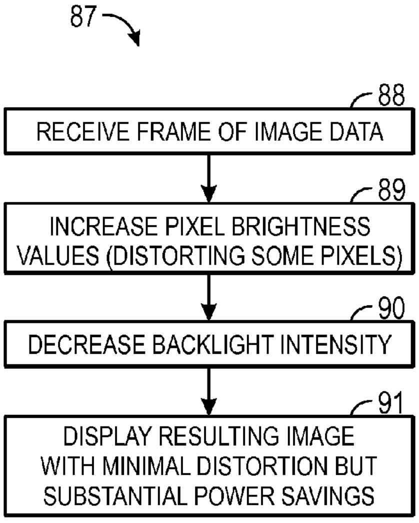
FIG. 7 is a flowchart of a method for saving power by reducing a backlight intensity of the LCD while increasing the brightness values of pixels of the image data, in accordance with aspects of the present disclosure.

Before the image data is displayed on the display 12, however, certain power-saving measures may be applied. As generally illustrated by a flowchart 87 of FIG. 7, a frame of image data may be received by the display and backlight control component 30 as illustrated in FIG. 1 (block 88). The display and backlight control component 30 may increase the brightness values of some of the pixels (block 89) and may decrease the intensity of the backlight unit 44 accordingly (block 90). As will be discussed in greater detail below, by allowing minor distortion in the form of lost pixel contrast to be introduced to some pixels at block 89, the backlight intensity may be more aggressively reduced at block 90. Even so, the display 12 may display the resulting image with such relatively minimal distortion, while offering substantially improved power savings (block 91). In other embodiments, components other than the display and backlight control component 30 may perform the adjustment of brightness values of the pixels and/or the intensity of the backlight unit 44.

Figure 8:
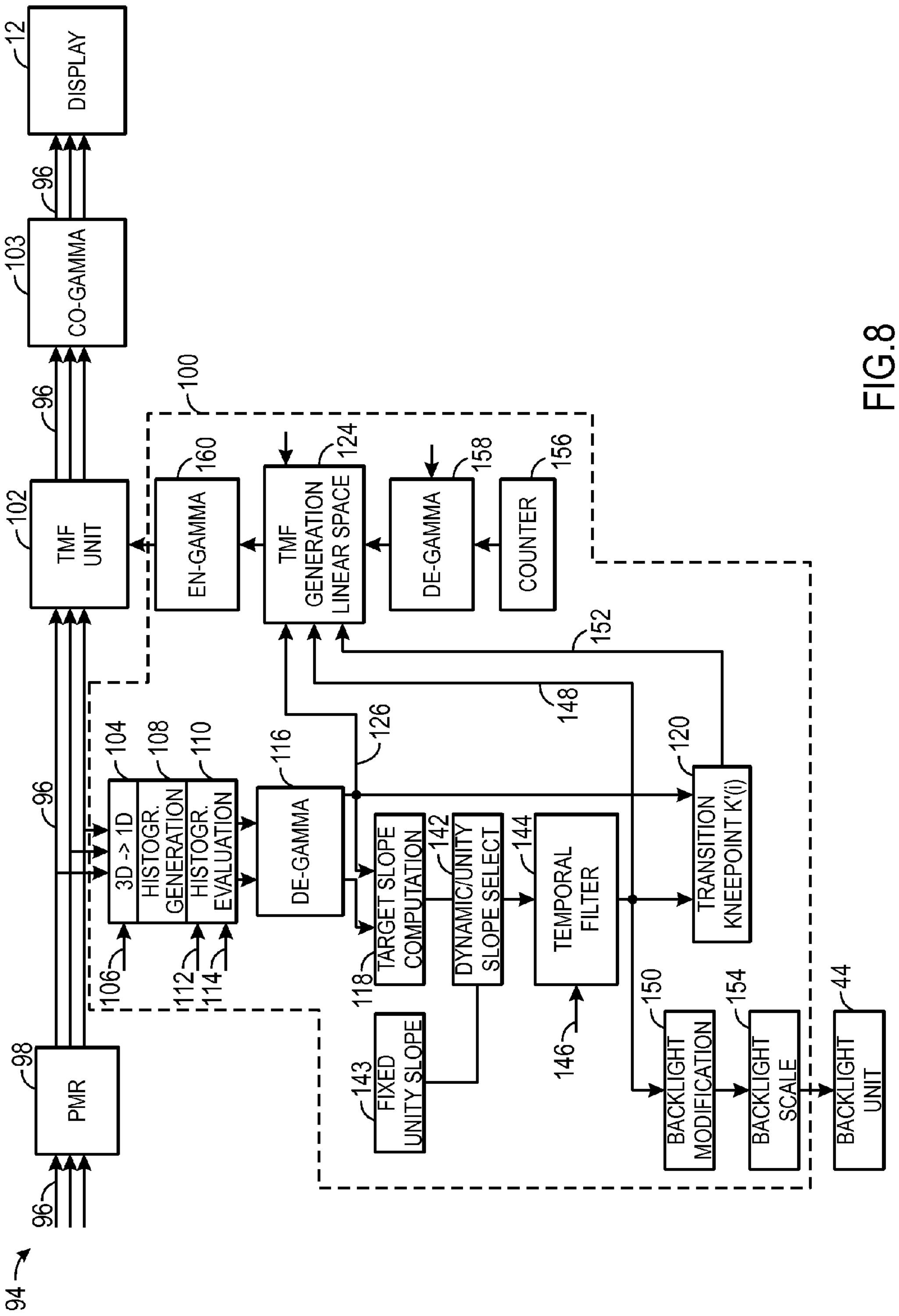
FIG. 8 is a block diagram representative of a dynamic pixel and backlight control unit of the backlight calibration unit of FIG. 1, in accordance with aspects of the present disclosure.

A dynamic pixel and backlight control component (DPB) 94 may operate to determine the adjustment of the pixels and of the backlight unit 44 discussed above. As illustrated in FIG. 8, the DPB 94 may be found, for example, in the display and backlight control component 30. It should be noted that the elements in the DPB 94 may include hardware, software (i.e., code or instructions stored on a tangible machine readable medium such as memory 20 or storage 22 and executed by, for example, processor 18), or some combination thereof. Additionally or alternatively, a processor and memory and/or storage may be utilized in the DPB 94 to perform any functions discussed in relation to the elements of the DPB 94.

Operation Outside of Pixel Pipeline

The DPB 94 may operate outside of and/or orthogonally to a pixel pipeline 96. Thus, the DPB 94 may determine adjustments to image frames being transmitted along the pixel pipeline 96—and the attendant power-savings from lowering the intensity of the backlight unit 44—without intensive processing. Frames of image data, also referred to in this disclosure as image frames, may be transmitted along the pixel pipeline 96 as sequential groups of pixel values to be applied to the unit pixels 60 during a period of time (e.g., one frame). The DPB 94 may sample the pixels from the pixel pipeline 96 after the pixels have been adjusted by a pixel modifier component (PMR) 98 using a vertical pipe structure 100. As will be discussed further below, the vertical pipe structure 100 may generate a tone mapping function based on the image frame and/or one or more previous image frames. A tone mapping function component (TMF) 102 may apply the tone mapping to the image frame. As noted above, the tone mapping function may cause the pixels of the image frame to become brighter even while partially distorting some of the pixels. This may allow the DPB 94 to lower the intensity of the backlight unit 44 more than might be possible if all distortion were avoided, even while largely preserving the appearance of image frame to the user. After applying the tone mapping function to the pixels in the TMF 102, the image frame may be processed by a co-gamma component 103 to calibrate pixels to the display 12 (e.g., based on manufacturer display calibration settings).

Because the vertical pipe structure 100 is orthogonal to the pixel pipeline 96, the pixels may be processed in the pixel pipeline 96 independently of how aggressively the DPB 94 seeks power savings by lowering the backlight unit 44 and distorting some of the pixels. Indeed, the PMR 98, the TMF 102, and the co-gamma component 103 may independently adjust the pixels of the image frame. Thus, for instance, the PMR 98 may be used to customize the look and feel of the images by modifying the contrast, black level suppression levels, and/or other components of the pixel data. In this manner, the PMR 98 may provide a more desirable image independently of the particular vendor of the display 12 and/or the aggressiveness of backlight power savings.

The orthogonal nature of the vertical pipe structure 100 to the pixel pipeline 96 may also substantially reduce the computational intensity of dynamically adjusting the image frames and backlight intensity. Indeed, as will be discussed further below, de-gamma and en-gamma processes may be executed on the tone mapping function itself within the vertical pipe structure 100, rather than on all of the pixels of the image frame. This alone may provide a 1000- to 100,000-fold reduction in computations that might otherwise take place if de-gamma and en-gamma were applied to the image frames instead.

Figure 9:
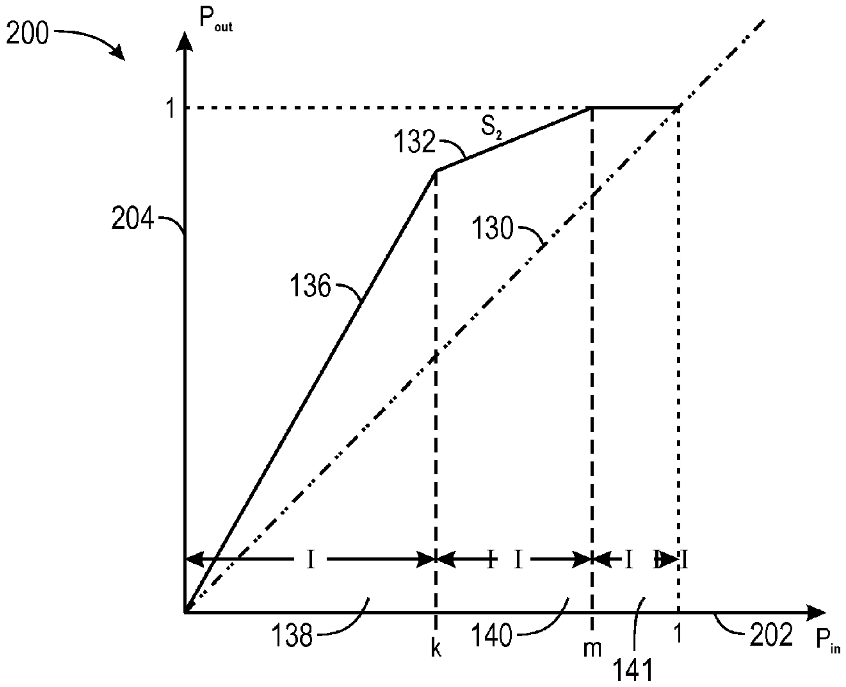
FIG. 9 is a graphical representation of an example tone mapping function that may used to brighten pixels of the image data and lower the intensity of the backlight unit, causing distortion only among pixels in a particular brightness region, in accordance with aspects of the present disclosure.

Before discussing how the vertical pipe structure 100 determines the tone mapping function that will be applied to the pixels in the TMF 102, FIG. 9 illustrates an example tone mapping function 200. The example tone mapping function 200 is illustrated in a linear space. As should be appreciated, however, the example tone mapping function 200 would first be transformed into the nonlinear framebuffer space before being applied to the pixels in the TMF 102.

The tone mapping function 200 of FIG. 9 relates the initial brightness of the input pixel (abscissa 202) with the resulting brightness of the output pixel (ordinate 204). A slope that would produce no change in the pixels is shown as a unity slope 130. If the unity slope 130 were applied to the pixels, a 1:1 brightness mapping would result. Since the pixels would not change, the backlight unit 44 intensity likewise would not change, and thus no power savings would be gained.

Instead, the tone mapping function 200 may be understood to use a distorting slope 132 (s2) and a nondistorting slope 136 (s). The nondistorting slope 136 (s) operates on pixels having brightness levels within a region 138 (Region I). The vertical pipe structure 100 may reduce the intensity of the backlight unit 44 based on the nondistorting slope 136 (s), and so the pixels of the region 138 (Region I) will have their brightnesses increase but will appear undistorted when displayed on the display 12. Meanwhile, the distorting slope 132 (s2) operates on pixels having brightness levels in a region 140 (Region II). Because the intensity of the backlight unit 44 will be determined based on the slope 136 (s), the distorting slope 132 (s2) will not correspond to the changes in the backlight unit 44 intensity. As such, the pixels of the region 140 (Region II) may appear distorted (having a lower contrast than otherwise). Pixels in a region 141 (Region III), to the extent that any such pixels occur in the image frame, may have drastically reduced contrast, all pixels in the region 141 being clipped to the same maximum desired brightness value. The number of pixels in the clipped region 141 (Region III) may be insignificant (e.g., 3-20 pixels) and the number of pixels in the distorted region 140 (Region II) may be some small percentage of the overall image pixels. As such, the loss of contrast provided by the tone mapping function to pixels of these regions may be substantially invisible to the user, even while providing substantial power savings through lowered backlight intensity.

By generating a tone mapping function that includes a region 140 (Region II) where some percentage of the pixels of the image frame are distorted, additional power savings may be obtained. Indeed, applying the lower value of the distorting slope 132 (s2) to pixels between a value k (a kneepoint brightness value, to be discussed further below) and a value m (a selected maximum value, also to be discussed further below), allows the slope 136 (s) to be higher than otherwise. The higher the slope 136 (s), the more aggressively the intensity of the backlight unit 44 is reduced without pixel distortion in the region 138 (Region I). In other words, by trading some amount of certain distortion among the pixels in the region 140 (Region II), the nondistorting slope 136 (s) may be increased and, accordingly, the intensity backlight unit 44 may be more sharply reduced, saving power while avoiding substantially any distortion among pixels in the region 138 (Region I).

Figure 10:
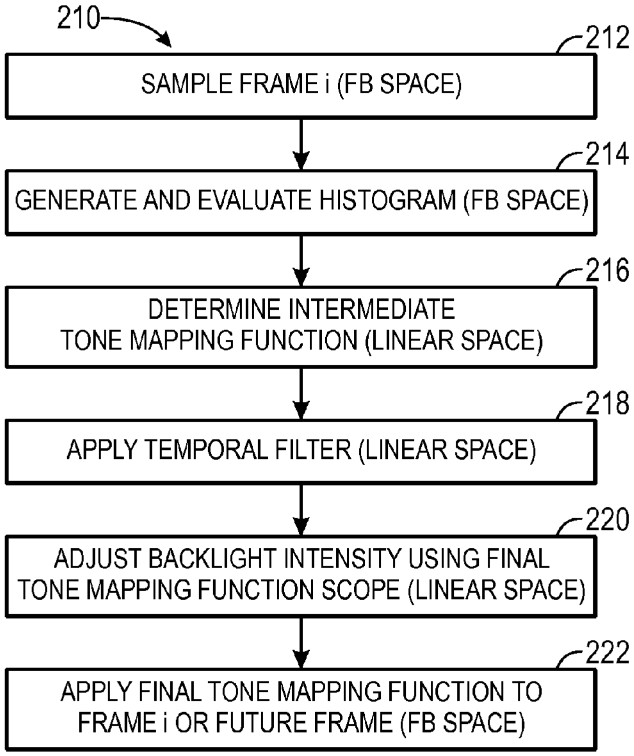
FIG. 10 is a flowchart of a method for determining the tone mapping function and adjusting the backlight outside of the pixel pipeline to the display, in accordance with aspects of the present disclosure.

The vertical pipe structure 100 may determine the tone mapping function as generally shown in a flowchart 210 of FIG. 10. The particular logical structures that carry out the method of the flowchart 210 will be discussed in greater detail further below. On a frame-by-frame basis, the vertical pipe structure 100 may sample each image frame i (block 212) in framebuffer space—the mathematical space in which the pixels are represented in the pixel pipeline 96—before generating and evaluating a histogram (block 214), also in framebuffer space, to identify a kneepoint brightness value k and a selected maximum desired brightness value m. The vertical pipe structure 100 may determine an intermediate tone mapping function (also referred to as a target tone mapping function) in linear space based on the kneepoint brightness value k and the selected maximum desired brightness value m (block 216). Applying a temporal filter in linear space to the intermediate tone mapping function (block 218) may produce a transition slope to be used in a final tone mapping function. The transition slope for the final tone mapping function may also be used to determine the adjustment to the intensity of the backlight unit 44 in linear space (block 220) and, when used to generate the final tone mapping function to adjust the pixels in the TMF 102 once again in framebuffer space (block 222).

It should be appreciated that conversions from framebuffer space to linear space and from linear space to framebuffer space may take place using relatively few values. This substantially reduces both the complexity and the total number of calculations that may be employed. Moreover, although this disclosure will describe generating and applying the tone mapping function on a frame-by-frame basis, generating and applying the tone mapping function may be performed in other ways. For example, generating and applying the tone mapping function may be performed once every multiple of frames, using a histogram that includes pixels obtained over several frames, and so forth.

Histogram Generation and Evaluation

As mentioned above, the vertical pipe structure 100 of the DPB 94 may generate the tone mapping function for the TMF 102 based on the individual characteristics of each image frame. The vertical pipe structure 100 may initially sample the image frames passing through the pixel pipeline 96 and generate histograms of pixel brightness values P of the pixels of the image frames. Certain values useful for generating the tone mapping function (e.g., a kneepoint brightness value k and a selected maximum desired brightness value m) may be identified from the histogram.

For example, a dimensionality transformation component 104 may receive copies of the pixels as they pass through the pixel pipeline 96. The dimensionality transformation component 104 may reduce the dimensionality of each input pixel from 3 color components to 1 brightness component. In this disclosure, histograms are generated based on these 1-dimensional components, but it should be appreciated that other embodiments may avoid reducing the dimensionality of the image pixel data and produce multiple histograms instead. As should be appreciated, in a display 12 having red, green, and blue pixels, each input pixel may include these three color components for a given frame i. Other displays 12 may employ more or fewer color components; for these, the dimensionality transformation component 104 may operate to reduce the dimensionality of the pixels in a similar manner.

Considering the case of a display 12 with red, green, and blue pixels, these color components are referred to below as R, G, B, which correspond to the red, green, and blue value for a given pixel of the display 12. The color components may be reduced to a monochrome pixel brightness value P. These pixel brightness values P may be collected to determine a histogram, as will be discussed further below.

The dimensionality transformation component 104 may reduce the dimensionality of each pixel from 3 colors to 1 brightness component using any suitable technique. To provide a few examples, the pixel brightness P may be determined according to following methods:

$$P=\max(R,G,B);\ \text{or} \qquad \text{Method 1.}$$

$$P=Cr*R+Cg*G+Cb*B \qquad \text{Method 2.}$$

In the equation of Methods 1 and 2, R, G, and B represent red, green, and blue color components, respectively, of the pixel. In the equation of Method 2, Cr represents a chroma red value, Cg represents a chroma green value, and Cb represents a chroma blue value. The value of P will be the same using either method 1 or 2 if the source image is monochrome or when the brightest parts of the source image are monochrome. Methods 1 and 2 differ for color images, however, in that method 1 is more conservative, causing the DPB 94 to produce less of a reduction in image quality but also less aggressive backlight power savings. Because method 2 produces a pure Luma histogram, method 2 may cause the resulting tone mapping function to desaturate or bleach some bright colors more than method 1.

To further reduce the computational complexity of the DPB 94, multiple pixels may be sampled at the same time. For instance, two adjacent pixels having color components R0, G0, B0 and R1, G1, B1, respectively, may be processed to determine a single histogram pixel brightness value P. Using the same methods mentioned above, but applied to sampling two pixels at a time, may occur as follows:

$$P=\max(R0,G0,B0,R1,G1,B1);\ \text{or} \qquad \text{Method 1.}$$

$$P=\max(Cr*R0+Cg*G0+Cb*B0,Cr*R0+Cg*G0+Cb*B0) \qquad \text{Method 2.}$$

Although the methods shown above have been applied to sample two pixels at a time, any suitable number of pixels may be sampled (e.g., 3, 4, 5, 10, or 20 pixels at a time). If more pixels than one are sampled to form each pixel brightness value P, a reduced number of pixel brightness values P will be used to form a histogram in the manner discussed below. While this may produce more conservative histograms, sampling more pixels at once may reduce the processing requirements of the DPB 94. The particular method and/or number of pixels sampled at a time may be selectable using a signal from a signal path 106. In embodiments involving processor-executable instructions, the dimensionality transformation component 104 may receive instructions that embody the selected method along path 106. In some embodiments, the pixels of the image frames in the pixel pipeline 96 may be 10-bit values. The resulting pixel brightness values P may be set to be any suitable precision and, in some examples, may have the same bit depth as the pixels of the pixel pipeline 96. Thus, when the pixels of the pixel pipeline have a bit depth of 10 bits, the pixel brightness values P may also be 10-bit values.

The pixel brightness values P may enter a histogram generation component 108, which may generate a single histogram with a desired number of bins (e.g., 16, 32, 64, 128, 256, 512, 1024, or another number of bins). The pixel brightness values P that are received by the histogram generation component 108 may binned into a histogram in any suitable way. For example, the pixel brightness values P may be truncated by dropping one or more of the least significant bits from the pixel brightness values P to generate values that may correspond to address values for the histogram generation component 108. With 10-bit pixel brightness values P, two least significant bits may be dropped to generate a resulting 8-bit value representing one of 256 possible bins. This resulting 8-bit bin value may be read out, incremented by one, and written back. In this way, histogram values Hn may be generated with n=0 . . . 255. This may generate, for example, a desired number of pixels ($N_{window}$) in the histogram generated by the histogram generation component 108. In some embodiments, $N_{window}$ may correspond to all the pixels in one frame.

For instance, the pixel values may be mapped to a histogram bin Bin using the following mapping:

Bin=P[9:2].

To enable the DPB 94 to operate primarily using pixels from a particular spatial area of the display 12 or only using pixels above a particular threshold brightness, certain embodiments of the histogram generation component 108 may only place pixel brightness values P in the histogram under certain conditions. For example, in some embodiments, the histogram generation component 108 may only place pixel brightness values P into the histogram when the pixel brightness values P derive from a particular region of the frame (e.g., located in a spatial window of the image frame as defined by a Window Upper Left value and a Window Bottom Right value). In another example, the histogram generation component 108 may only place pixel brightness values P into the histogram when the pixel brightness values P exceed some minimum pixel brightness value (e.g., a threshold th, such as discussed further below).

Figure 11:
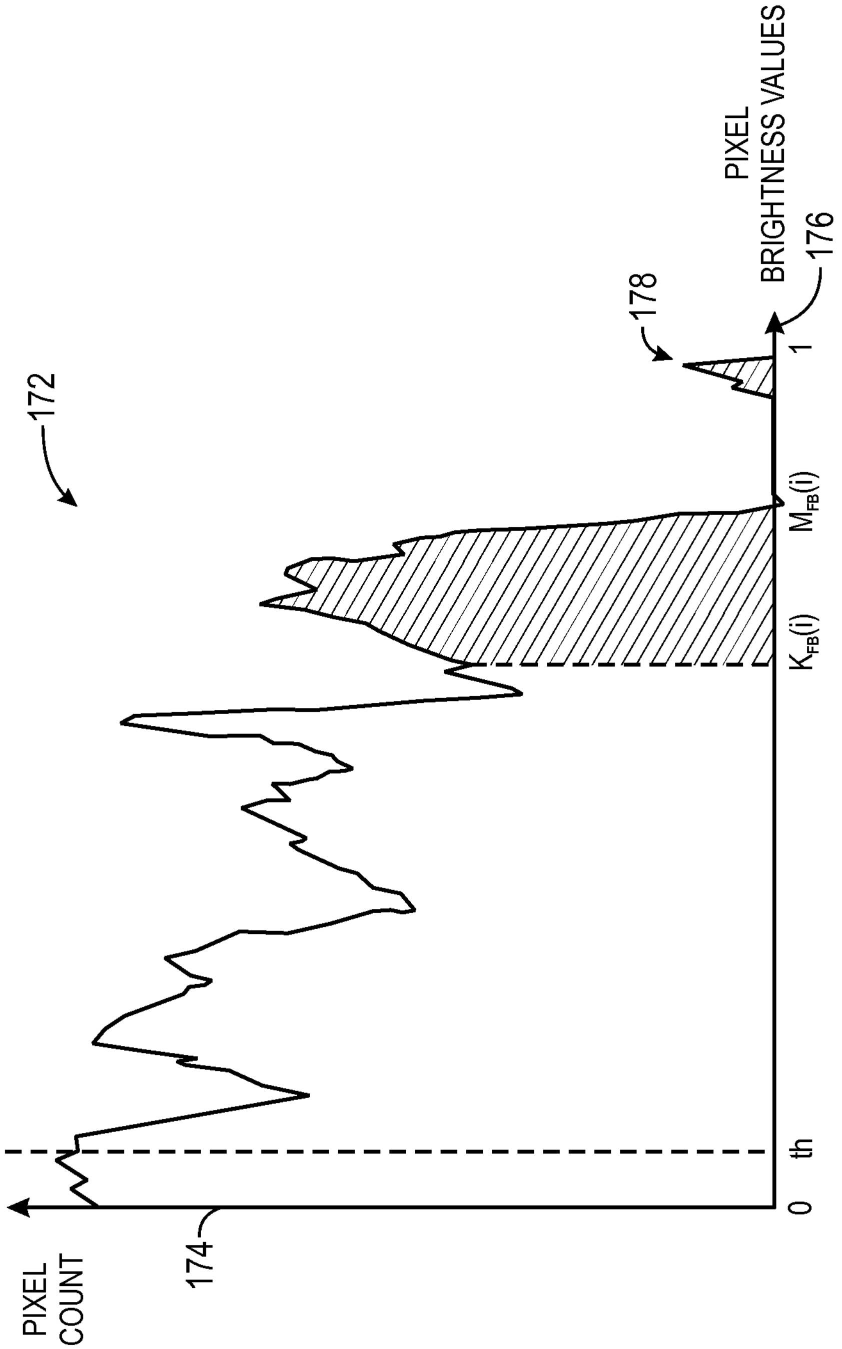
FIG. 11 is a graphical representation of a histogram of an image frame determined by the dynamic pixel and backlight control unit of FIG. 8 in accordance with aspects of the present disclosure.

A graphical representation of a histogram generated by the histogram generation component 108 appears in FIG. 11 as a plot 172. The plot 172 illustrates various a pixel counts 174 in bins of pixel brightness values 176 with brightness values that span from no transmissivity (0) to full transmissivity (1). Such a histogram may be used by a histogram evaluation unit 110 to identify certain pixel values useful for generating the tone mapping function that will be applied to the pixels in the TMF 102. In FIG. 11, pixels in the lowest bins, corresponding to pixels beneath a threshold value th, have been included. In some embodiments, however, these pixels may not be added to the histogram in the first place. As will be discussed further below, the pixels beneath the threshold value th may be ignored for the purpose of some future calculations.

As also illustrated in FIG. 11, two values may be extracted from the histogram: a maximum desired brightness value $m_{FB}(i)$ and a kneepoint brightness value $k_{FB}(i)$. These values use the subscript "FB" to refer to framebuffer space, which is the mathematical space in which the pixels have been binned into the histogram. The term "framebuffer space" is used in this disclosure to refer to the mathematical space in which the pixels are defined in the pixel pipeline 96 for viewing by the human eye. As will be discussed below, future calculations may take place in a linear space.

The maximum desired brightness value $m_{FB}(i)$ and the kneepoint brightness value $k_{FB}(i)$ will be used by the logic discussed further below to generate an intermediate tone mapping function, on which the ultimate tone mapping function will be based and the slope of which will be used to control the backlight unit 44. The maximum desired brightness value $m_{FB}(i)$ generally corresponds to the value of one of the brightest pixels in the histogram of frame i. The pixels between the kneepoint brightness value $k_{FB}(i)$ and the maximum desired brightness value $m_{FB}(i)$ would suffer some contrast distortion by the tone mapping function generated based on these values (but will allow for much greater backlight power savings), so the kneepoint brightness value $k_{FB}(i)$ may be selected to cause a relatively small percentage of the total image pixels to become distorted.

A clipping value $n_{clip}$ (number of pixels to clip) or $p_{clip}$ (percentage of pixels to clip) may be used in the selection of the maximum desired brightness value $m_{FB}(i)$ to exclude the brightest few pixels (e.g., 1, 2, 3, 4, 8, 10, 12, 16, or 20 pixels, and in many cases between 3-20 pixels). As shown in FIG. 11, bright pixels 178 have been excluded from being counted in the histogram of the plot 172. In this example, excluding some of the brightest pixels from being considered in the selection of the maximum desired brightness value $m_{FB}(i)$ has prevented a small number of bright pixels from unduly affecting the selection of the maximum desired brightness value $m_{FB}(i)$. As will be discussed further below, the selection of the maximum desired brightness value $m_{FB}(i)$ may have a significant impact on the resulting tone mapping function that will be generated and, accordingly, the degree to which the intensity of the backlight unit 44 can be decreased.

It should be understood, however, that by excluding some number of the brightest pixels using the clipping value $n_{clip}$ or $p_{clip}$, the brightest pixels that have been excluded from being considered for the maximum desired brightness value $m_{FB}(i)$ will likely be substantially distorted (e.g., clipped). Distorting these $n_{clip}$ or $p_{clip}$ brightest pixels, however, is not expected to be substantially noticeable in most images. Still, distorting the very brightest few pixels may be noticeable in some images. As such, whether to exclude the brightest $n_{clip}$ or $p_{clip}$ pixels may be programmable and/or may vary depending on certain spatial characteristics identifiable in the image.

In one example, the $n_{clip}$ or $p_{clip}$ brightest pixels may be ignored in determining the maximum desired brightness value $m_{FB}(i)$ when the $n_{clip}$ or $l_{clip}$ brightest pixels are spatially remote from one another in the image (e.g., in an image showing stars arrayed apart from one another on a dark sky). The $n_{clip}$ or $p_{clip}$ brightest pixels may not be ignored and may be considered in determining the maximum desired brightness value $m_{FB}(i)$ when the $n_{clip}$ or $p_{clip}$ brightest pixels are spatially nearby to one another (e.g., in an image showing a single image moon on a dark sky). In the first example, involving an image of stars against a dark sky, the losses of contrast of the individual brightest pixels—representing the stars—may not be noticeable to a user because these brightest pixels are surrounded by dark pixels. In the second example, involving an image of the moon against a dark sky, the losses of contrast of the individual brightest pixels—representing various bright areas of the moon—may become noticeable to the user because these brightest pixels are adjacent to one another.

When $n_{clip}$ or $p_{clip}$ is applied conditionally, any suitable technique may be used to identify whether the brightest few pixels of the image are spatially remote or spatially nearby one another. For instance, in some embodiments, additional framebuffer memory may be allocated to track the location of bright pixels in the. Since this may be computationally inefficient, however, other techniques may be employed that use one or more counters to roughly determine when bright pixels are located nearby one another. For example, a first counter may be reset each time a pixel over a threshold brightness value is sampled, and the first counter may be incremented each time a subsequent pixel is sampled by the histogram generation component 108 that is not over the brightness value. When the next pixel over the threshold brightness value is sampled, the first counter may be compared to a threshold pixel distance value. If the value of the first counter is beneath the threshold pixel distance value, this may roughly indicate that the two most recently sampled bright pixels are nearby one another. As such, a second counter may be incremented. When all of the pixels of the image frame have been sampled, the total count of the second counter may be compared to a conditional clipping threshold. If the total count of the second counter exceeds the conditional clipping threshold, indicating that most of the bright pixels of the image frame are remote from one another (e.g., remotely located stars against a dark sky), the brightest $n_{clip}$ or $p_{clip}$ pixels may be excluded in the histogram evaluation component 114 from being considered to be the maximum desired brightness value $m_{FB}(i)$ because to do so would not be expected to impact the user's viewing experience. Otherwise, if the total count of the second counter does not exceed the conditional clipping threshold, indicating that the bright pixels of the image frame are not mostly remote from one another (e.g., a single moon against a dark sky), the brightest $n_{clip}$ or $p_{clip}$ pixels may not be excluded and may be selected as the maximum desired brightness value $m_{FB}(i)$.

The histogram evaluation component 110 may select the second value of the histogram, the kneepoint brightness value $k_{FB}(i)$, as a value some number of pixels less than the maximum desired brightness value $m_{FB}(i)$. As noted above, the pixels between the kneepoint brightness value $k_{FB}(i)$ and the maximum desired brightness value $m_{FB}(i)$ will suffer some contrast distortion when the tone mapping function is ultimately applied to the image. As such, the kneepoint brightness value $k_{FB}(i)$ may be selected to cause some percentage ($P_{mod}$) of the total image pixels to become distorted (reduced in contrast).

The histogram evaluation unit 110 may receive two inputs useful to extract $k_{FB}(i)$. The first input may be transmitted along path 112 and may be a threshold value th. The second input may be transmitted along path 114 and may be the value $P_{mod}$ mentioned briefly above. The threshold value th may be used to determine which pixels in $N_{window}$—a total number of pixels of the histogram up to the maximum desired brightness value $m_{FB}$—are above the set threshold th. The number of pixels above the threshold th may be called $N_{effective}$, and may allow for elimination of darker pixels (e.g., from a background when a light pixels of an image are present) from the relevant image part to be altered by the tone mapping function that will be determined Thus, in some embodiments, only pixels in the set $N_{effective}$ may be used with to identify $k_{FB}(i)$ via the value $P_{mod}$ and/or $p_{clip}$. In the example of FIG. 11, the pixels of the set $N_{effective}$ may be those along pixel brightness values 176 between th and the maximum desired brightness value $m_{FB}(i)$. In other embodiments, the the pixels of the set $N_{effective}$ may be those along pixel brightness values 176 between th and 1.

It should be noted that $N_{effective}$ may be useful, for example, in allowing for the scaling of the DPB 94 process regardless of the image data to be processed. For example, taking a close-up image of an item (such as a face) against a background and moving that item into the distance of the image in a subsequent frame could present a problem. When the PMR process is applied, a certain percentage of pixels (e.g., $P_{mod}$) may not be properly rendered due to the PMR process. These improperly rendered pixels tend to be in the item and not the background because, in general, image backgrounds tend to be uniform and/or tend not to include pixels with between the kneepoint brightness value $k_{FB}(i)$ and the maximum desired brightness value $m_{FB}(i)$. Thus, if the item is a large part of the image, any degradation of the overall image will tend to be spread over a large number of pixels constituting the item. However, if the item is a small part of the image, any degradation of the overall image will tend to be spread over a small number of pixels constituting the item. Thus, by applying the threshold th to the pixels to remove certain pixels from the overall set constituting $N_{effective}$, the PMR process may allow for a certain percentage of pixels (e.g., $P_{mod}$) to set based on $N_{effective}$ and not on the overall amount of pixels in the frame (thus alleviating any issue of over degradation of a small item surrounded by a background value).

The kneepoint brightness value $k_{FB}(i)$ may be selected as a value lower than the maximum desired brightness value $m_{FB}(i)$, between which a certain percent ($P_{mod}$) of pixels of the set $N_{window}$ or $N_{effective}$, as may be desired, are located. The pixels located between the kneepoint brightness value $k_{FB}(i)$ and the maximum desired brightness value $m_{FB}(i)$ may be distorted in contrast by the tone mapping function that will be determined using these values. As such, the $P_{mod}$ value may correspond to the percentage of contrast-reduced pixels for a given frame i. That is, 1-$P_{mod}$ of the pixels for $N_{effective}$ of a frame i generally may, after the tone mapping function is applied and backlight intensity reduced, maintain an intended (as given by the source frame) appearance of brightness. Stated differently, $P_{mod}$ may be a set value that may correspond to the percentage of pixels in the LCD that will be affected (i.e., have their contrasts reduced) by the DPB 94. In some embodiments, $P_{mod}$ may be a value between approximately 0% and 10% (e.g., 0%, 0.1%, 0.2%, 0.3%, 0.4%, 0.5%, 1%, 2%, 5%, or 10%). Higher values of $P_{mod}$ may produce greater amounts of distortion but also greater power savings. In this way, based on the received $P_{mod}$ value and the calculated set of $N_{effective}$ pixels, the $k_{FB}(i)$ may be extracted from the histogram generated by the histogram generation component 108.

The identified values $m_{FB}(i)$ and $k_{FB}(i)$ are values in framebuffer space, which is a nonlinear mathematical space used in the pixel pipeline 96. Determining the intermediate and final tone mapping functions based on these values, however, may occur in linear space. As such, identified values $m_{FB}(i)$ and $k_{FB}(i)$ may be transmitted to a de-gamma component 116, which may linearize these two values $m_{FB}(i)$ and $k_{FB}(i)$ from the framebuffer space to the linear space. The resulting values may be represented as a linearized maximum pixel brightness m(i) and a linearized kneepoint brightness value k(i). By generating the histogram and calculating the values $m_{FB}(i)$ and $k_{FB}(i)$ in framebuffer space, then transforming these two values into linear space, a substantial number of computations may be avoided by not transforming the large quantities of values used in the histogram.

Generation of Intermediate Tone Mapping Function

The linearized maximum pixel brightness m(i) and the linearized kneepoint brightness value k(i) may be used to generate an intermediate tone mapping function that, when temporally filtered, may be used to generate a final tone mapping function. To this end, the de-gamma component 116 may transmit the linearized maximum pixel brightness m(i) to a target slope computation component 118, which may determine target slopes of the intermediate tone mapping function; to a transition kneepoint block 120 along path 122, which may be used to determine the final tone mapping function values; as well as to a tone mapping function (TMF) generator 124 along path 126, which may prepare the final tone mapping function to be sent to the TMF 102. The de-gamma component 116 may transmit the linearized kneepoint brightness value k(i) to the target slope calculation component 118.

Figure 12:
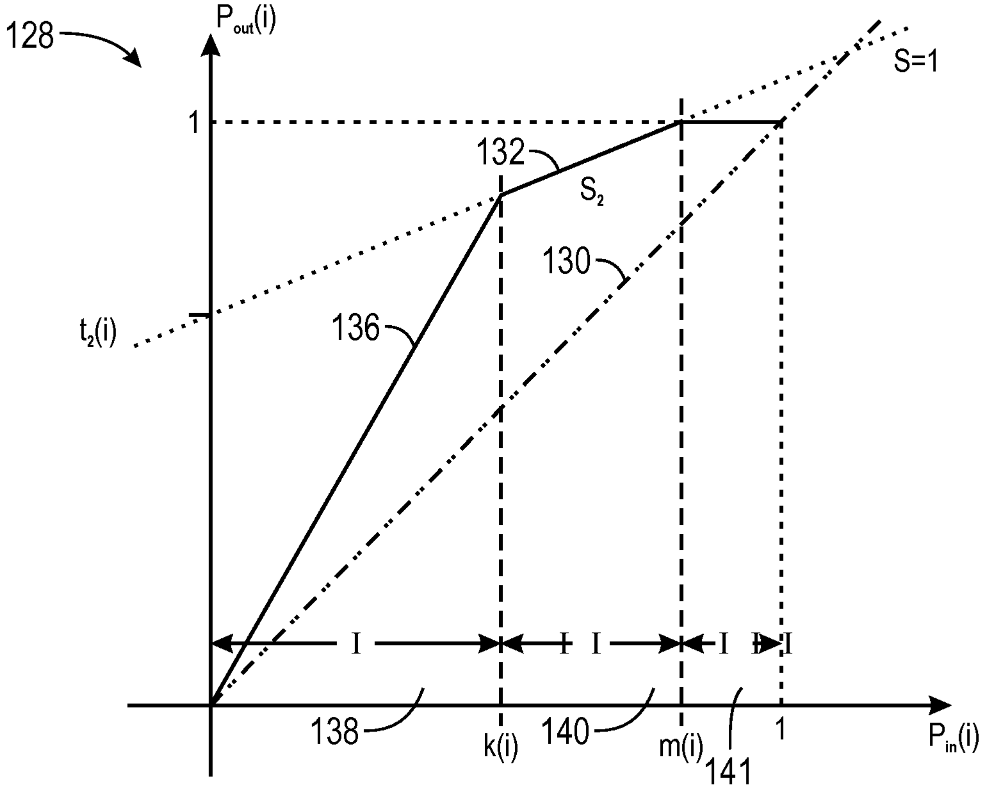
FIG. 12 includes graphical representations of a first computation made by the dynamic pixel and backlight control unit of FIG. 8 in accordance with aspects of the present disclosure.

FIG. 12 illustrates a graphical representation 128 of the information derived in the target slope calculation component 118. The target slope calculation component 118 may utilize m(i) and k(i) and the distorting slope value s2 to determine a main nondistorting slope value s(i). The distorting slope value s2 corresponds to a slope value to be used for pixels in the region 140 (Region II) between m(i) and k(i) and may be programmable. The distorting slope value s2 may be selected to distort the pixels of the region 140 (Region II) by some amount (e.g., 30%). It should be appreciated that, given m(i), k(i), s2, the main nondistorting slope value s(i), also called a target nondistorting slope or instantaneous slope for the frame i, may be derived in a relatively straightforward way in linear space.

As in FIG. 9, FIG. 12 illustrates a slope value 130, which may correspond to a minimum slope allowed for the target slope calculation component 118, the distorting slope value 132 (s2), and the target nondistorting slope value 136 (s(i)). As illustrated, the target nondistorting slope value s(i) 136 may represent a function that would be applied to all pixels in the region 138 (Region I) if applied in the TMF 102 (in practice, the target nondistorting slope value s(i) will be temporally filtered and thus may be different from the nondistorting slope value st(i) that will be used in the final tone mapping function). The region 138 (Region I) may include, for example, all pixels up to the kneepoint brightness value k(i) that would not be distorted (e.g. 90% or more of the total number of pixels, depending on $P_{mod}$), whereas the distorting slope value s2 132 may represent a linear function that would be applied to all pixels in the region 140 (Region II) that would be distorted to some degree. Pixels in the region 141 (Region III), to the extent that any such pixels occur in the image frame, would have drastically reduced contrast. All pixels in the region 141 would be clipped to the same maximum desired brightness value if the intermediate tone mapping function of plot 128 were applied.

For the region 138 (Region I), the target nondistorting slope value s(i) 136 may be found as s(i)=(1−s2 (m(i)−k(i)))/k(i), which may also be represented as s2+(1−m(i)s2)/k(i). Additionally, for region 140 (Region II), the offset for the affine function in region 140 of the tone mapping function may be derived from m(i), such that $t_2(i)=1-m(i)s2$.

Returning to FIG. 8, the target nondistorting slope value s(i) may be transmitted to a slope selector 142. The slope selector 142 may operate as a multiplexer that effectively allows for activation and deactivation of the DPB 94 pixel and backlight adjustments. Specifically, the slope selector 142 receives the target nondistorting slope value s(i) from the target slope computation component 118 and a unity value (e.g., 1) from the fixed unity slope generator 143. If the unity value is selected, the vertical pipe structure 100 will send the unity slope value into a temporal filter 144, causing the final tone mapping function to gradually return to unity (i.e., no reduction in backlight consumption and no change in the pixel values). In this way, the DPB 94 vertical pipe structure 100 may appear to seamlessly switch "on" and "off."

This selection may be made depending on the use of the device 10. For example, on a user interface screen (e.g., back screen) that a user sees with great frequency, the slope selector 142 may select the unity value. In contrast, when movies or pictures are to be displayed on the display 12, the target nondistorting slope value s(i) may be selected by the slope selector 142. If the target nondistorting slope value s(i) is selected by the slope selector 142, then adjustment of the backlight and pixel values will be applied to the display 12 as described further below. Thus, while it is contemplated that the slope selector 142 may transmit unity values, for the remainder of this discussion, it will be assumed that the slope selector 142 is transmitting the target nondistorting slope value s(i).

Temporal Filtering

As described above, the slope selector 142 may select the target nondistorting slope value s(i). The target nondistorting slope value s(i) may be transmitted to the temporal filter 144. The temporal filter 144 may receive as an input the target nondistorting slope s(i) and may produce as an output a filtered version of the target nondistorting slope s(i) as the transition slope st(i). In one embodiment, the temporal filter 144 may allow for transition cases, each with a programmable duration. The temporal filter 144 may utilize threshold values to select between the transmission cases. For example, at each frame, the temporal filter 144 may decide if a new transition should occur and which of a set of time constants should be applied to the new transition. These time constants and thresholds may be received along path 146 and, in some embodiments, time constants and thresholds may also be supplied to one or more of the additional elements of the vertical pipe structure 100.

The filtering may be implemented with memory cells initially all set to a default value (e.g., 1). When the temporal filter 144 is enabled, the first frame is received and the memory cells may be populated with the target nondistorting slope s(i). As each frame is received, all cells are shifted by one, and for example, the oldest cell will be discarded, with the newest cell being set to s(i). The output value for this process is, thus, transition slope st(i) and represents the average of all s(i).

Thus, at each frame, the temporal filter 144 may decide if a new transition should occur and which one of a set of time constants to choose for the new transition. The temporal filter 144 compares at each frame i the input slope s(i) with the currently used slope of the system st(i). The comparison may occur in the sequence below:

$$s(i)>(1+pth\_md)*st(i)=>t=tmd \qquad \text{case I.}$$

$$s(i)>(1+0)*st(i)=>t=td \qquad \text{case II.}$$

$$s(i)<(1-pth\_mb)*st(i)=>t=tmb \qquad \text{case III.}$$

$$s(i)\leq(1+0)*st(i)=>t=tb \qquad \text{case IV.}$$

For these cases, pth_md represents the threshold between a darker and a much darker backlight value (e.g., 0.3), pth_mb represents the threshold between a brighter and a much brighter backlight value (e.g., 0.3), tmd represents the transition duration to a much darker backlight level (e.g., 128 frames), td represents the transition duration to a darker backlight level (e.g., 32 frames), tmb represents the transition duration to a much brighter backlight level (e.g., 4 frames), and tb represents the transition duration to a brighter backlight level (e.g., 16 frames). That is, transitions and thresholds may be applied based on changes in the brightness of the backlight unit 44 due to, for example, changes in images to be displayed in a series of image frames (e.g., a movie changing from a dark scene to a light scene) and may be applied over a number of time durations (e.g., a number of frames) including, for example, 1, 2, 4, 8, 16, 32, 64, 128, 256, or another number of frames that may vary depending on the determined changes in backlight values.

Figure 13:
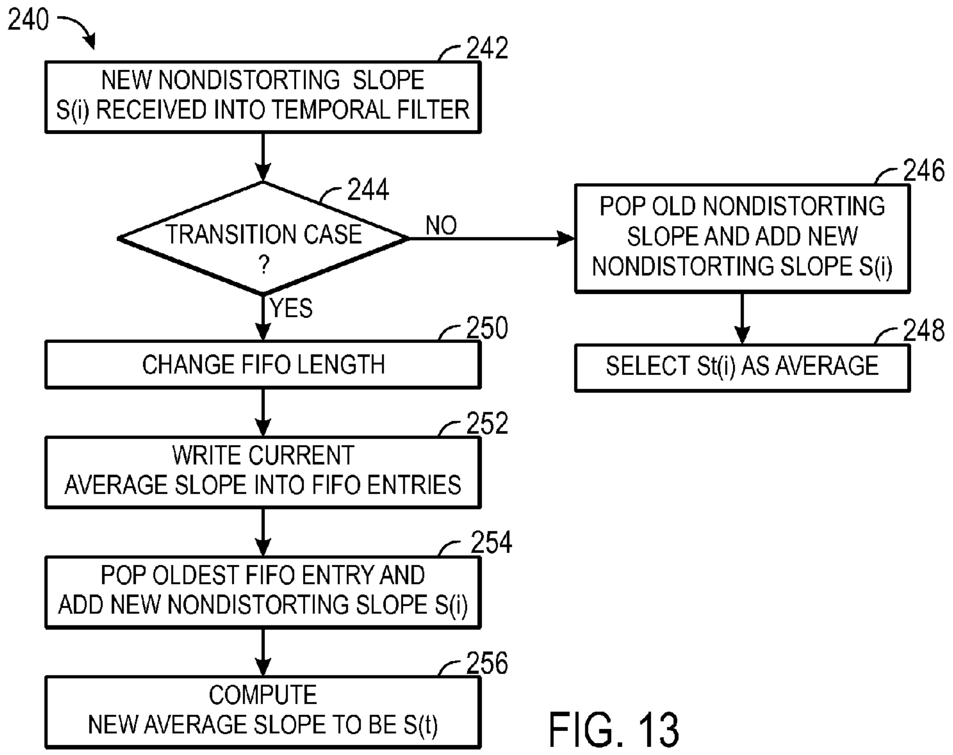
FIG. 13 is a flowchart of a method for temporally filtering a nondistorting target slope to be used for both the tone mapping function and backlight intensity adjustment, in accordance with aspects of the present disclosure.

FIG. 13 provides a flowchart 240 that represents one manner of temporally filtering the target nondistorting slope 136 s(i) to obtain a transition nondistorting slope st(i) that will be used to (1) adjust the backlight intensity and (2) determine the final tone mapping function. Specifically, a new target nondistorting slope 136 s(i) may be received into the temporal filter 144 (block 242). If a new transition case (e.g., case I, II, III, or IV) is not identified (decision block 244), the temporal filter 144 may pop the oldest target nondistorting slope s stored in its FIFO memory (and also subtracts this value from a running total) and may add the new target nondistorting slope s(i) to the FIFO memory (and also add this value to the running total) (block 246). The average value of the temporal filter 144 FIFO may be selected as the transition nondistorting slope st(i) (block 248) (e.g., by dividing the running total by the total number of transition frames). By determining the average from the running total rather than adding all of the values stored in the FIFO every time, a substantial number of computations may be avoided.

When a transition case (e.g., cases I, II, III, or IV) is identified (decision block 244), the FIFO length may be changed in the manner mentioned above (block 250) and the current average st(i) written into the new FIFO entries (block 252). The temporal filter 144 may pop the oldest target nondistorting slope s stored in its FIFO memory—as provided at block 252, this will be a value representing the previous average—and may add the new target nondistorting slope s(i) (block 254). The average value of the temporal filter 144 FIFO may be selected as the transition nondistorting slope st(i) (block 256). The transition nondistorting slope st(i) may be determined, in some examples, as follows: st(i)=((st(i−1)*len(FIFO))+(s(i)+st(i−1))/len(FIFO).

When the images to be displayed move from a dark image to a bright image, the tmb transition duration may have to be very rapid (e.g., 4 frames or fewer). However, as the transition from the currently used slope of the system st(i) to the target nondistorting slope s(i) is undertaken, if additional determinations of backlight values are made, the transition duration may switch to, for example, tb, representing the transition duration to a brighter backlight level. That is, as the backlight value is changing, it may affect the originally selected transition duration. In the case of moving from a very dark image to a bright image, extension of this transition duration could appear as a defect in the device 10. Accordingly, in the situation where the tmb transition is selected, no other comparison of current and desired backlight levels may be made for the duration of the tmb transition. This may allow the desired transition to occur as quickly as possible.

Other situations may occur in the temporal filter 144. For example, when a time constraint is switched (e.g., from 64 to 128), memory locations of the temporal filter may have been only populated with 64 values (e.g., averaged to be the currently used slope of the system st(i)). In this case, additional 64 memory locations of the temporal filter 144 may be populated with the value corresponding to the currently used slope of the system st(i). One technique for this process may include copying the sum of the values in memory of the temporal filter 144 and, when a new frame value is received, the temporal filter 144 may enter the new st(i) value and remove the oldest st(i) value from memory. The temporal filter 144 may then subtract the oldest st(i) value from the sum of the values in memory, add the newest st(i) value to the sum of the values in memory, and store this value as the new sum in memory of the temporal filter 144. This may allow for an up-to-date value that may be utilized when the temporal filter switches between the number of memory locations used to store values (corresponding, for example, to the duration times discussed above). Alternatively or additionally, the new sum of the values in memory of the temporal filter 144 may be created by multiplying the average slope of the system s(i) by the new time constant when the time constant changes (e.g., is switched from 64 to 128).

Figure 14:
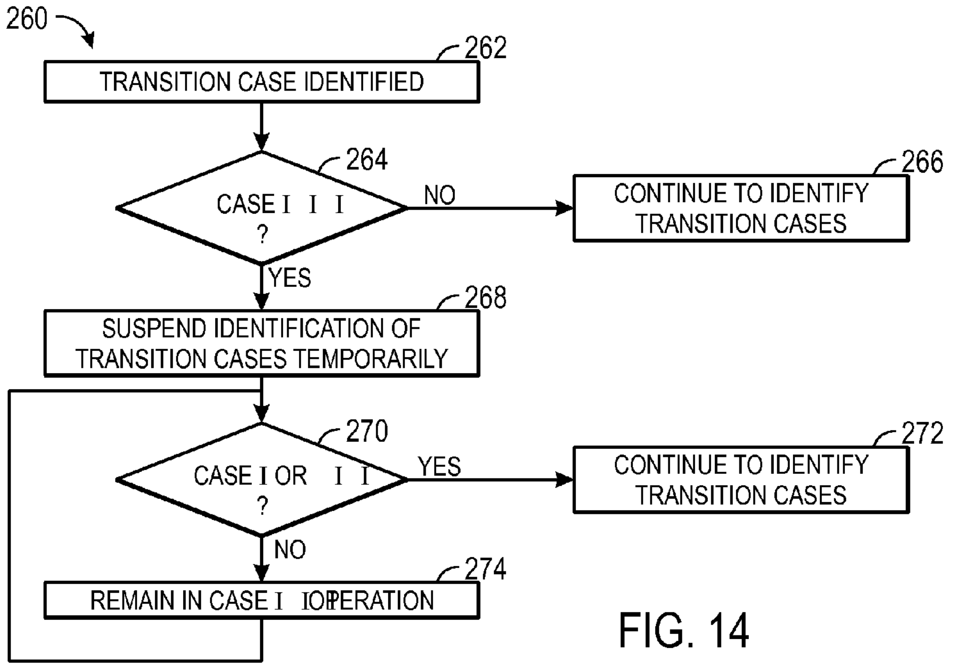
FIG. 14 is a flowchart of a method for temporally filtering the nondistorting target slope when the image frame transitions to a much brighter image, in accordance with aspects of the present disclosure.

As discussed above, transitioning to a much brighter image may invoke a Case III transition. To prevent certain artifacts from occurring, the temporal filter may operate as illustrated by a flowchart 260 of FIG. 14. Namely, when a transition case is identified (block 262) that does not correspond to Case III (decision block 264), the temporal filter 144 may continue to detect and respond to transition cases (block 266). When the transition case does correspond to Case III (decision block 264), however, the temporal filter 144 may temporarily suspend its identification of case transitions (block 268). For example, the temporal filter 144 may stop identifying transitions for some programmable number of frames and may operate according to Case III under these conditions. Afterward, if transitions according to Case I or Case II are identified (decision block 270), the temporal filter 272 may apply case-appropriate actions for these, including potentially identifying Case III transitions in the future (block 272). Otherwise, if only transitions according to Case III or Case IV are identified (decision block 270), the temporal filter 144 may remain in Case III operation (block 274) until a Case I or Case II transition is identified.

Backlight Intensity Determination Based on Transition Slope

As previously noted, the output of the temporal filter 144 may be the slope st(i) that represents the transition slope of the region 138 (Region I). This value may be transmitted to, for example, the transition kneepoint block 120, the tone mapping function (TMF) generator 124 along path 148, and to the backlight value calculation component 150. In one embodiment, the kneepoint block 120 may utilize m(i) and st(i) to calculate and transmit a transition kneepoint kt(i) along path 152, whereby kt(i) may represent the kneepoint brightness value to be applied in the final tone mapping function.

The backlight value calculation component 150 may calculate a modification factor for the backlight unit 44. For example, this value may be the inverse of the transition nondistorting slope st(i) (e.g., 1/st(i)). This value is representative of the amount of change (e.g., reduction) in brightness for the backlight unit 44 given the change (e.g., increase) in pixel brightness that will be applied to the pixels in the nondistorting region 138 (Region I) of the tone mapping function. In other words, the backlight intensity will be decreased in a corresponding manner in which the brightnesses of most of the image frame pixels will be increased, causing the pixels of the nondistorting region 138 (Region I) of the tone mapping function to appear virtually unchanged to the user (as compared to a situation in which the image is not altered and the backlight intensity is not changed).

Thus, the backlight value calculation component 150 may determine how much to alter the power consumed by the backlight unit 44. Such a light intensity modification value may be transmitted to the backlight scale unit 154, which may include a look up table of values that, for example, correspond to currents or pulse width modulation (PWM) values to be provided to the backlight unit 44 based on the modification value received from the backlight value calculation component 150. This value (e.g., a current value or a signal indicative of a current value or PWM value to be applied) may be transmitted to the backlight unit 44 to alter the amount of light emitted by the backlight unit 44.

Determination and Application of Final Tone Mapping Function

Having adjusted the intensity of the backlight unit 44, a final tone mapping function using the same nondistorting transition slope st(i) that was used to determine the backlight intensity may be applied to the pixels using the TMF application component 102. To do so, a counter 156 may be utilized in conjunction with a de-gamma component 158, a TMF generator 124, and an en-gamma component 160. The counter may be a counter that increments a count by a set increment and transmits the value to the de-gamma component 158. This count may be used, for example, to set the amount of calculation to be made in the TMF generator 124. The count may be transformed into a linear space in the de-gamma component 158 for transmission to the TMF generator 124. In some embodiments, the DPB 94 may be utilized to pre-compute pixel modifications and program a lookup table of the TMF component 102. In one example, the counter 156 may count i=0:16:63*16 counts from 0 to 1024-16 in increments of 16 and with an increment of 15 to the last node of 1023, thereby generating 65 different 10-bit framebuffer values. When these values are passed sequentially through the de-gamma component 158, 65 16-bit linear space gray values result. These linear space values may be passed through the linear space TMF computations, discussed further below, and finally through the en-gamma component 160. The result may be 65 10-bit values that are stored in 65 memory cells of the TMF 102.

Figure 15:
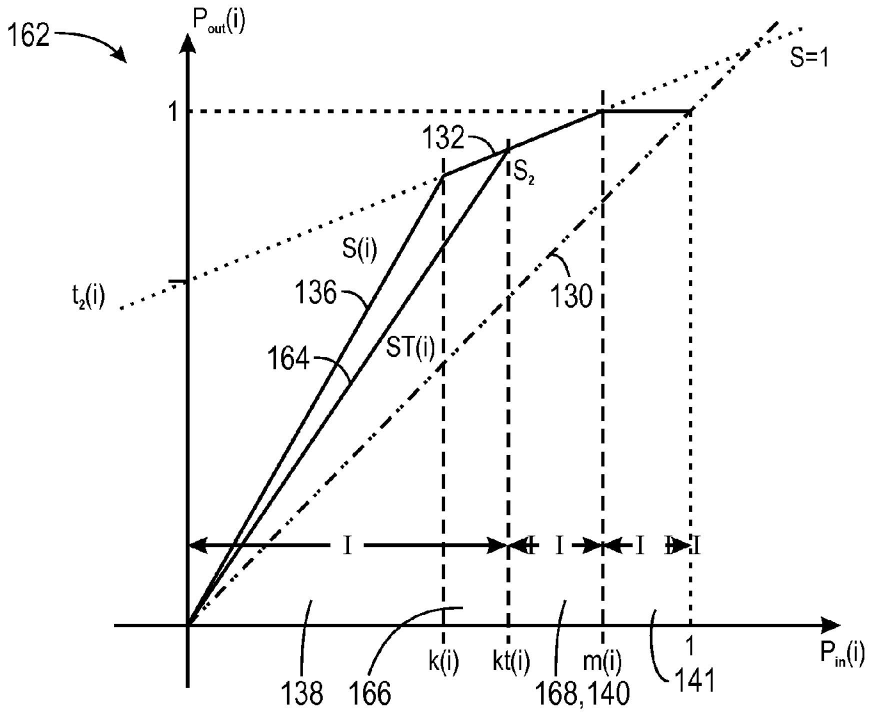
FIG. 15 includes second graphical representations of a second computation made by the dynamic pixel and backlight control unit of FIG. 8 in accordance with aspects of the present disclosure.
Figure 16:
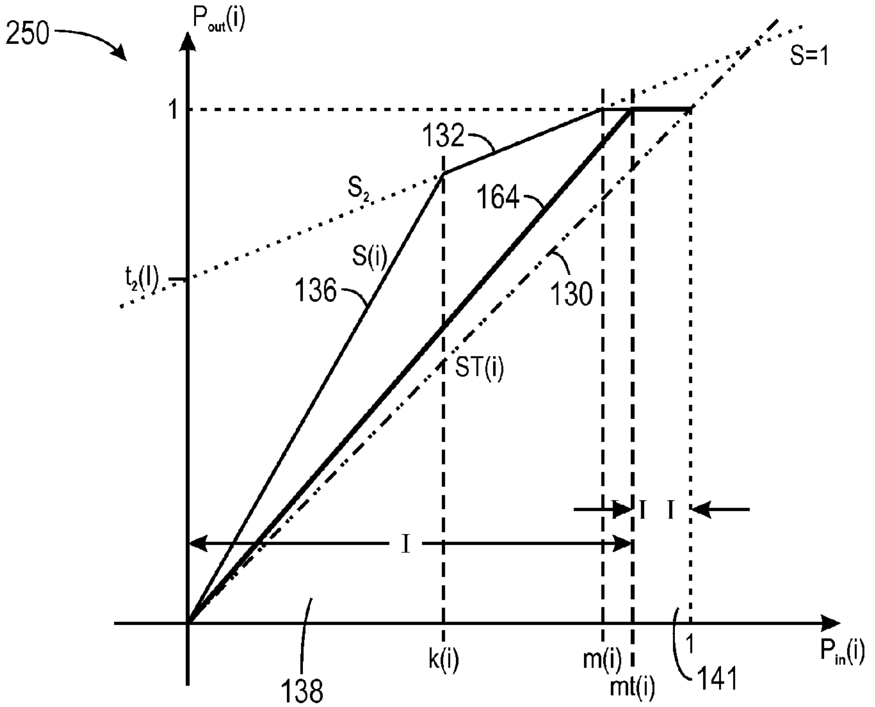
FIG. 16 is another example of the second computation made by the dynamic pixel and backlight control unit of FIG. 8 in accordance with aspects of the present disclosure.

The TMF generator 124 may utilize m(i), kt(i), st(i), and the slope value s2 to determine the final tone mapping function. This process may be illustrated by graphs in FIGS. 15 and 16, which illustrate graphical representations of the information that may be used by the TMF generator 124. In FIG. 15, a representation 162 may include a unity slope value 130, which may correspond to a minimum slope allowed for the TMF generator 124, the distorting slope value s2 132, the target nondistorting slope value s(i) 136, as well as the transition nondistorting st(i) slope 164. As illustrated, target nondistorting slope value s(i) 136 is shown simply as a point of comparison to the output of the temporal filter 144, the transition nondistorting st(i) slope 164. In practice, the temporal filter 144 will have effectively used the target nondistorting slope value s(i) 136 as a target value to move the st(i) slope 164 toward the target nondistorting slope value s(i) 136 over time. That is, as discussed above, the transition nondistorting slope st(i) 164 may represent an average across one or more frames.

When used by the TMF generator 124, the region 138 (Region I) covering all pixels that the nondistorting transition slope value st(i) will be applied to may include, for example, all pixels up to kt(i) thereby encompassing a region 166. The distorting slope value s2 132 may represent a function that will be applied to all pixels in the region 140 (Region II), which now encompasses a second region 168 (including the remaining pixels between m(i) and kt(i)). It should be noted that kt(i) may be found as kt(i)=(1−m(i)s2)/(st(i)−s2) in the transition kneepoint component 120.

In situations where kt(i)<m(i), which is illustrated in FIG. 15, then for pixel locations corresponding to locations 0-kt(i) (region 166), the output value of the pixels will be $p_{out}$=st(i) $p_{in}$ (where $p_{in}$ is the respective input values of each pixel in region 166 as found in the temporal filter block), while the pixel locations corresponding to kt(i)−m(i), (region 168), the output value of the pixels will be $p_{out}$=s2 $p_{in}$+t2(i), with t2(i)=1−m(i) s2 (where $p_{in}$ is the respective input values of each pixel in region 168). Essentially, then, the area of the region 138 (Region I) will grow, and the area of region 140 (Region II) will become smaller as compared to the original target values. If kt(i)≥m(i), as illustrated by a plot 250 in FIG. 16, then region 140 (Region II) disappears. A transition point mt(i) may be defined as mt(i)=1/st(i). Within this larger region 138 (Region I), the pixel output value may be understood to equal $p_{out}$=st(i)*$p_{in}$.

Returning to FIG. 8, the pixel output values $p_{out}$ may be transmitted from the TMF generator 124 to the en-gamma component 160. The en-gamma component 160 may encode the values from linear space into frame buffer space. The frame buffer values may then be sent to the TMF component 102. Because only the tone mapping function values, not the pixels of the pixel pipeline 96, are processed from the linear space into the framebuffer space, a tremendous amount of computational complexity may be reduced. Indeed, in some cases, this may provide a 1000- to 100,000-fold reduction in computations that might otherwise take place if de-gamma and en-gamma were instead applied to the pixels in the pixel pipeline 96.

The TMF component 102 may operate as a lookup table that receives pixel data along pipe line 96 and $p_{out}$ values from the en-gamma component 160, and generates modified pixel data based on received pixel data and $p_{out}$ values (e.g., the TMF component 102 may modify incoming pixel data based on the programming of the DPB 94). For example, red, green, and blue values for each pixel in a frame may be changed from their original values to new values, whereby the new values are based on the change in the amount of light being transmitted from the backlight unit 44. For example, if the intensity of the light from backlight unit 44 is reduced according to the slope st(i), the tone mapping function applied to the pixels may brighten the pixel brightness values so that the resultant luminance seen by the user is nearly identical to the situation in which the backlight is driven at the original level with the original pixel data values. Although some pixels may suffer a loss of contrast (e.g., depending on the value of $p_{mod}$, the slope 132 (s2), and m(i) or mt(i)), these pixels may few enough in number so as not to affect perception of the image by the user, while allowing substantial power savings in the backlight unit 44.

It should be appreciated that the entire process described above may be repeated periodically (e.g., once every vertical blanking interval (VBI) of the display 12). In some embodiments, the tone mapping function generated based on frame i may be applied to the same frame i (for example, an additional framebuffer may be used in the TMF 102 to hold frame i until the following VBI). In other embodiments, however, the tone mapping function generated based on frame i may be applied to the next frame, frame i+1. It is believed that the resulting distortion that results from applying the tone mapping function of frame i to frame i+1 is neglible.

Finally, as discussed above, the modified pixel data may be transmitted from the TMF component 102 to the co-gamma component 103. The co-gamma component 103 may calibrate the display 12 based on, for example, manufacturer display calibration settings. For example, the co-gamma component 103 may impose a vendor-by-vendor panel calibration on the display 12. The resulting modified, calibrated pixels may be displayed on the display 12.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method comprising:

generating a pixel brightness histogram of an image frame passing through a pixel pipeline toward display on an electronic display, wherein the histogram is generated in a nonlinear space;

selecting one or more pixel brightness values from the histogram in the nonlinear space;

converting the one or more pixel brightness values from the nonlinear space into a linear space;

determining a tone mapping function based at least in part on the one or more pixel brightness values in the linear space;

reducing an intensity of a backlight of the electronic display based at least in part on a nondistorting portion of the tone mapping function;

converting the tone mapping function to the nonlinear space; and applying the tone mapping function to the image frame or a subsequent image frame in the pixel pipeline in the nonlinear space, wherein pixels of the image frame to which the nondistorting portion of the tone mapping function is applied appear substantially undistorted despite the reduction in backlight intensity.

2. The method of claim 1, wherein generating the brightness histogram comprises:

sampling pixels of the image frame sequentially, wherein each of the pixels comprises a plurality of color components;

determining a monochrome pixel brightness value for each of the pixels;

disposing the pixel brightness values into a plurality of bins.

3. The method of claim 2, wherein determining the monochrome pixel brightness value for each pixel comprises selecting a maximum brightness value of the plurality of color components of each of the pixels.

4. The method of claim 2, wherein determining the monochrome pixel brightness value for each pixel comprises determining a pure luma value associated with each of the pixels.

5. The method of claim 1, wherein selecting the one or more pixel brightness values comprises selecting a maximum desired brightness value corresponding to the brightest value in the pixel brightness histogram.

6. The method of claim 1, wherein selecting the one or more pixel brightness values comprises selecting a maximum desired brightness value corresponding to the brightest value in the pixel brightness histogram other than a first plurality of pixels of brighter pixel brightness values, wherein the first plurality of pixels of brighter pixel brightness values correspond to pixels that will be clipped by the tone mapping function when the tone mapping function is determined based at least in part on the maximum desired brightness value.

7. The method of claim 1, wherein selecting the one or more pixel brightness values comprises selecting a maximum desired brightness value and a kneepoint brightness value, wherein pixel brightness values occurring between the maximum desired brightness value and the kneepoint brightness value correspond to brightness values of pixels that will be distorted by the tone mapping function when the tone mapping function is determined based at least in part on the maximum desired brightness value and the kneepoint brightness value.

8. The method of claim 7, wherein the kneepoint brightness value is selected each frame such that a certain percentage of all pixels of the image frame have brightness values from the kneepoint brightness value to the maximum desired brightness value.

9. The method of claim 7, wherein the kneepoint brightness value is selected each frame such that a certain percentage of all pixels of the image frame that are above a threshold brightness value have brightness values substantially from the kneepoint brightness value to the maximum desired brightness value.

10. The method of claim 1, wherein the method is performed on a frame-by-frame basis.

11. An electronic device comprising:

a processor that generates a stream of pixels;

an electronic display panel that displays the stream of pixels;

a backlight that illuminates the electronic display panel;

a pixel pipeline that provides the stream of pixels to the electronic display panel; and dynamic pixel and backlight control circuitry that:

samples the stream of pixels to determine a first brightness value and a second brightness value for each frame, wherein a percentage value of image-related pixels of each frame that have brightness values from the first brightness value to the second brightness value remains substantially constant from frame to frame, and wherein the first brightness value is lower than the second brightness value;

determines a tone mapping function based at least in part on the first brightness value and the second brightness value, wherein the tone mapping function comprises:

a nondistorting portion for pixels having brightness values from a darkest brightness value to up to the first brightness value; and a distorting portion for pixels having brightness values from the first brightness value to the second brightness value;

adjusts an intensity of the backlight based at least in part on the nondistorting portion of the tone mapping function; and provides the tone mapping function to the pixel pipeline to apply to the stream of pixels, wherein pixels of the stream of pixels to which the nondistorting portion of the tone mapping function is applied appear substantially undistorted despite the adjustment of backlight intensity.

12. The electronic device of claim 11, wherein the dynamic backlight and control circuitry samples the stream of pixels to determine the first brightness value and the second brightness value in a nonlinear space, transforms the first brightness value and the second brightness value from the nonlinear space to a linear space, and determines the tone mapping function in the linear space.

13. The electronic device of claim 11, wherein the dynamic backlight and control circuitry determines the first brightness value and the second brightness value for each frame depending on the percentage value, wherein the percentage value is a programmable value.

14. The electronic device of claim 11, wherein the dynamic backlight and control circuitry determines image-related pixels of each frame by ignoring pixel brightness values beneath a threshold.

15. An electronic display comprising:

a light-modulating display panel configured to display frames of image data;

a backlight configured to emit an intensity of light through the display panel to generate images;

a pixel pipeline configured to provide the frames of image data to the display panel; and a vertical pipe structure outside of the pixel pipeline configured to generate brightness histograms of the frames of image data, control the intensity of the light based at least in part on information gained from one or more of the brightness histograms, and generate tone mapping functions to apply to the frames of image data based at least in part on the information gained from the one or more brightness histograms.

16. The electronic display of claim 15, wherein the vertical pipe structure is configured to generate the brightness histograms by:

sampling multiple color components of pixels of the image frames;

computing monochrome pixel brightness values from the sampled color components; and disposing the pixel brightness values into bins.

17. The electronic display of claim 16, wherein the vertical pipe structure is configured to compute each monochrome pixel brightness value one pixel at a time according to the following relationship:

$$P=\max(R,G,B)$$

where P represents the pixel brightness value, R represents a red color component of the pixel, G represents a green color component of the pixel, and B represents a blue color component of the pixel.

18. The electronic display of claim 16, wherein the vertical pipe structure is configured to compute each monochrome pixel brightness value one pixel at a time according to the following relationship:

$$P=Cr*R+Cg*G+Cb*B$$

where P represents the pixel brightness value, R represents a red color component of the pixel, G represents a green color component of the pixel, B represents a blue color component of the pixel, Cr represents a chroma red value, Cg represents a chroma green value, and Cb represents a chroma blue value.

19. The electronic display of claim 16, wherein the vertical pipe structure is configured to compute each monochrome pixel brightness value from a group of two or more pixels at a time, wherein each monochrome pixel brightness value corresponds to a brightest color component value among each group of the two or more pixels.

20. The electronic display of claim 16, wherein the vertical pipe structure is configured to compute each monochrome pixel brightness value from a group of two or more pixels at a time, wherein each monochrome pixel brightness value corresponds to a Luma value associated with each group of the two or more pixels.

21. The electronic display of claim 16, wherein the vertical pipe structure is configured to dispose the pixel brightness values into the bins by:

truncating the pixel brightness values by one or more least significant bits to generate a value equal to one of the bins;

incrementing a counter corresponding to the one of the bins.

22. The electronic display of claim 21, wherein the pixel brightness values are 10-bit values and wherein the vertical pipe structure is configured to truncate the pixel brightness values by two least significant bits to obtain a bin value between 0 and 255.

23. The electronic display of claim 15, wherein the vertical pipe structure is configured to generate the brightness histograms of the frames of image data for a programmable spatial window within the frame defined by two opposite corner pixels of the spatial window.

24. A method comprising:

sequentially sampling pixels of an image frame being passed through a pixel pipeline toward a display panel;

generating a pixel brightness histogram based on the sampled image frames; and determining a maximum brightness value of the pixel brightness histogram, wherein the maximum brightness value is a defined number or a defined percentage of the pixels lower than the very brightest pixel of the pixel brightness histogram, wherein the defined number or defined percentage of the pixels varies depending on a spatial occurrence in the image frame of pixels above a threshold brightness value.

25. The method of claim 24, wherein the defined number or defined percentage of pixels is lower when most of the pixels above the threshold brightness value are adjacent to one another.

26. The method of claim 24, comprising determining the defined number or defined percentage of pixels by:

incrementing a first counter each time a pixel not over the threshold brightness value is sampled;

when a pixel that is over the threshold brightness value is sampled:

comparing the first counter to a threshold pixel distance value;

incrementing a second counter when the first counter is beneath the threshold pixel distance value; and resetting the first counter; and determining the defined number or defined percentage of pixels based at least in part on the second counter.

27. The method of claim 26, wherein the defined number or defined percentage of pixels is higher when the second counter exceeds a conditional clipping threshold than otherwise.

28. A dynamic pixel and backlight control system comprising:

a dimensionality transformation component configured to determine monochrome pixel brightness values, each based on one or more pixels in nonlinear space passing along a pixel pipeline of an electronic display;

a histogram generation component configured to generate a histogram in the nonlinear space using the monochrome pixel brightness values;

a histogram evaluation component configured to select two different pixel brightness values of the histogram in the nonlinear space;

a de-gamma component configured to convert the two pixel brightness values from the nonlinear space to a linear space; and tone mapping function generation logic configured to generate a tone mapping function based at least in part on the two pixel brightness values in linear space;

wherein the components of the dynamic pixel and backlight control system do not directly operate on pixels in the pixel pipeline.

* * * * *